United States Patent
Kim et al.

(10) Patent No.: US 9,801,164 B2
(45) Date of Patent: Oct. 24, 2017

(54) METHODS AND DEVICES FOR TRANSMITTING SCHEDULING REQUEST IN WIRELESS ACCESS SYSTEM

(71) Applicant: LG ELECTRONICS INC., Seoul (KR)

(72) Inventors: Bonghoe Kim, Seoul (KR); Dongyoun Seo, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 14/779,287

(22) PCT Filed: Apr. 18, 2014

(86) PCT No.: PCT/KR2014/003430
§ 371 (c)(1),
(2) Date: Sep. 22, 2015

(87) PCT Pub. No.: WO2014/171794
PCT Pub. Date: Oct. 23, 2014

(65) Prior Publication Data
US 2016/0073394 A1 Mar. 10, 2016

Related U.S. Application Data

(60) Provisional application No. 61/813,189, filed on Apr. 18, 2013.

(51) Int. Cl.
*H04W 4/00* (2009.01)
*H04W 72/04* (2009.01)
(Continued)

(52) U.S. Cl.
CPC ..... *H04W 72/0413* (2013.01); *H04J 11/0053* (2013.01); *H04L 5/0053* (2013.01);
(Continued)

(58) Field of Classification Search
CPC ............ H04W 72/0413; H04W 72/14; H04W 72/1278; H04L 5/0055; H04L 5/001; H04L 5/0053
(Continued)

(56) References Cited

U.S. PATENT DOCUMENTS

2011/0243066 A1* 10/2011 Nayeb Nazar .......... H04L 1/007
370/328
2012/0063377 A1    3/2012 Osterling et al.
(Continued)

FOREIGN PATENT DOCUMENTS

CN   101483599      7/2009
CN   101860472     10/2010
(Continued)

OTHER PUBLICATIONS

PCT International Application No. PCT/KR2014/003430, Written Opinion of the International Searching Authority dated Jul. 28, 2014, 15 pages.
(Continued)

*Primary Examiner* — Sai-Ming Chan
(74) *Attorney, Agent, or Firm* — Lee Hong Degerman Kang Waimey

(57) ABSTRACT

The present invention provides methods for transmitting an RS in a wireless access system supporting a multiple connection mode, in which user equipment is connected to two or more small cells, and devices supporting same. According to one embodiment of the present invention, a method for user equipment transmitting a scheduling request (SR) in the wireless access system supporting the multiple connection mode, comprises the steps of: receiving, from a first small cell in the multiple connection mode, an upper layer signal comprising SR parameters for transmitting the SR; generating the SR based on the SR parameters; and transmitting
(Continued)

the SR by using a physical uplink control channel (PUCCH) signal, wherein the SR parameters are pre-established through negotiation with the first small cell and a second small cell in the multiple connection mode, the user equipment in the multiple connection mode maintains connection with the two or more small cells including the first small cell and the second small cell, and wherein the first small cell and the second small cell can be mutually connected through a non-ideal backhaul link.

8 Claims, 20 Drawing Sheets

(51) Int. Cl.
  *H04J 11/00* (2006.01)
  *H04W 72/14* (2009.01)
  *H04W 72/12* (2009.01)
  *H04L 5/00* (2006.01)
(52) U.S. Cl.
  CPC ....... *H04L 5/0055* (2013.01); *H04W 72/1278* (2013.01); *H04W 72/14* (2013.01); *H04L 5/001* (2013.01)
(58) Field of Classification Search
  USPC .......................................................... 370/329
  See application file for complete search history.

(56) References Cited

U.S. PATENT DOCUMENTS

| | | | |
|---|---|---|---|
| 2012/0307760 A1* | 12/2012 | Han | H04L 5/001 370/329 |
| 2013/0250875 A1* | 9/2013 | Chen | H04W 52/365 370/329 |
| 2013/0258886 A1* | 10/2013 | Chen | H04B 7/0417 370/252 |
| 2014/0126399 A1* | 5/2014 | Damnjanovic | H04W 72/1252 370/252 |

FOREIGN PATENT DOCUMENTS

| | | |
|---|---|---|
| CN | 102461280 | 5/2012 |
| KR | 10-2011-0079759 | 7/2011 |
| KR | 10-2012-0005515 | 1/2012 |
| KR | 10-2012-0124262 | 11/2012 |
| WO | 2012/094151 | 7/2012 |
| WO | 2012093953 | 7/2012 |

OTHER PUBLICATIONS

PCT International Application No. PCT/KR2014/003430, Written Opinion of the International Searching Authority dated Jul. 28, 2014, 19 pages.

* cited by examiner

FIG. 2
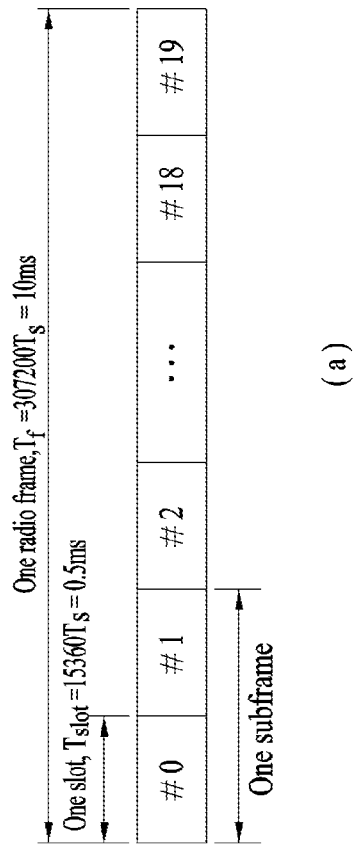
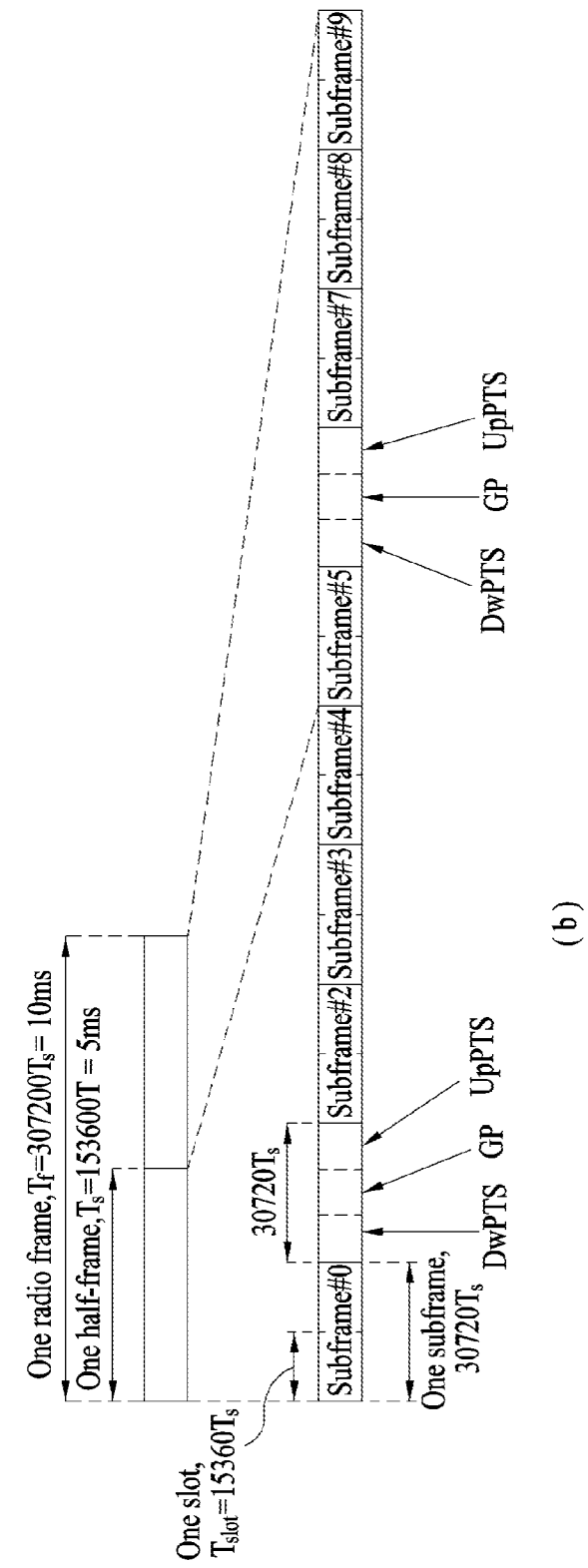

FIG. 4
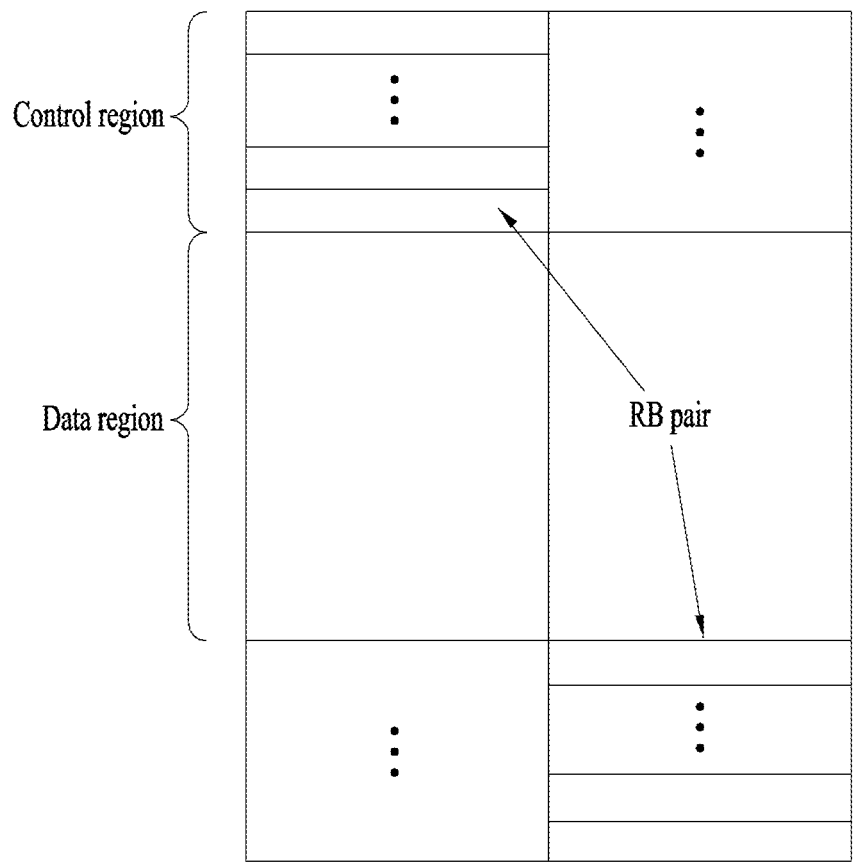
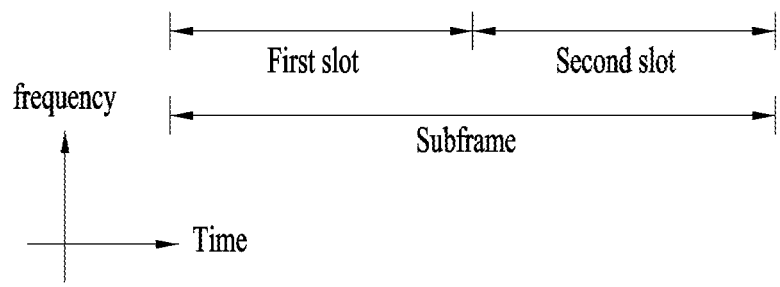

PUCCH format 1a and 1b structure (Normal CP case)

PUCCH format 1a and 1b structure (Extended CP case)

PUCCH format 2,2a and 2b structure (Normal CP case)

PUCCH format 2,2a and 2b structure (Extended CP case)

FIG. 10

Resource allocation: 18 ACK/NACK channels with normal CP $\Delta_{shift}^{PUCCH} = 2$

| Cell specific cyclic shift offset | | | RS orthogonal cover | | | ACK/NACK orthogonal cover | | |
|---|---|---|---|---|---|---|---|---|
| $\delta_{offset}^{PUCCH} = 1$ | $\delta_{offset}^{PUCCH} = 0$ | | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | | n' = 0 | | | n' = 0 | | |
| 2 | 1 | | | 6 | 12 | | 6 | 12 |
| 3 | 2 | | 1 | | | 1 | | |
| 4 | 3 | | | 7 | 13 | | 7 | 13 |
| 5 | 4 | | 2 | | | 2 | | |
| 6 | 5 | | | 8 | 14 | | 8 | 14 |
| 7 | 6 | | 3 | | | 3 | | |
| 8 | 7 | | | 9 | 15 | | 9 | 15 |
| 9 | 8 | | 4 | | | 4 | | |
| 10 | 9 | | | 10 | 16 | | 10 | 16 |
| 11 | 10 | | 5 | | | 5 | | |
| 0 | 11 | | | 11 | 17 | | 11 | 17 |

$\Delta_{shift}^{PUCCH} \in \{\{1,2,3\}$ for normal cyclic prefix $\{1,2,3\}$ for extended cyclic prefix $\delta_{offset}^{PUCCH} \in \{0,1,...,\Delta_{shift}^{PUCCH} - 1\}$ Cell specific cyclic shift offset Cell-specific Cyclic shift value of CAZAC sequence $n_{OC}$ Orthogonal sequence index for ACK/NACK
$\bar{n}_{OC}$ Orthogonal sequence index for RS
$n_{CS}$ Cyclic shift value of a CAZAC sequence
n' ACK/NACK resource index used for the channelization in a RB

METHODS AND DEVICES FOR TRANSMITTING SCHEDULING REQUEST IN WIRELESS ACCESS SYSTEM

CROSS-REFERENCE TO RELATED APPLICATIONS

This application is the National Stage filing under 35 U.S.C. 371 of International Application No. PCT/KR2014/003430, filed on Apr. 18, 2014, which claims the benefit of U.S. Provisional Application No. 61/813,189, filed on Apr. 18, 2013, the contents of which are all hereby incorporated by reference herein in their entirety.

TECHNICAL FIELD

The present invention relates to a radio access system and, more particularly, to a method for transmitting scheduling request (SR) in an environment, in which a user equipment (UE) is connected to two or more small cells, and a device supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Recently, the structure of a radio access system has changed to a structure in which small cells (e.g., pico cells, femto cells, etc.) having various shapes and small sizes are connected to a macro cell having a relatively large size. This aims to enable a user equipment (UE), which is an end user, to receive a high data rate to increase quality of experience in a state in which multilayered cells having vertical layers, in which conventional macro cells are fundamentally involved, are mixed.

However, in an environment in which a large number of small cells is arranged, a UE may be connected to two or more small cells to transmit and receive data. At this time, since the small cells are connected via a non-ideal backhaul, it is difficult to share data or scheduling information. At this time, the UE shall transmit control information of several small cells using a restricted uplink control channel. Accordingly, there is a need to transmit uplink control information using a method different from that of a legacy cellular system.

DISCLOSURE

Technical Problem

The present invention devised to solve the problem relates to a method for transmitting scheduling request (SR) in an environment, in which a user equipment (UE) is connected to two or more small cells, and a device supporting the same.

An object of the present invention devised to solve the problem lies in various methods for transmitting uplink (UL) data after SR request in a multi-connectivity mode.

Another object of the present invention devised to solve the problem lies in methods for performing SR transmission to small cells in a multi-connectivity mode without collision.

Another object of the present invention devised to solve the problem lies in methods for receiving uplink (UL) grant from small cells in a multi-connectivity mode without collision and transmitting UL data without degradation in PAPR and CM performance.

Another object of the present invention devised to solve the problem lies in devices supporting such methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The object of the present invention can be achieved by providing a method for transmitting a reference signal (RS) in a wireless access system, in which a user equipment (UE) is connected to two or more small cells and supports a multi-connectivity mode, and a device supporting the same.

The object of the present invention can be achieved by providing a method for transmitting scheduling request (SR) by a user equipment in a wireless access system for supporting a multi-connectivity mode, the method including receiving a higher layer signal including a SR parameter for SR transmission from a first small cell in the multi-connectivity mode, generating first SR based on the SR parameter, generating second SR to be transmitted to a second small cell that configures the multi-connectivity mode with the first small cell, and transmitting the first SR and the second SR to the first small cell and the second small cell, respectively.

The SR parameter may be set via pre-negotiation with the first small cell and the second small cell in the multi-connectivity mode, the UE may maintain a plurality of connection with two or more small cells including the first small cell and the second small cell in the multi-connectivity mode, and the first small cell and the second small cell may be connected to each other via a non-ideal backhaul link.

The first SR and the second SR may be transmitted using a physical uplink control channel (PUCCH) signal. In addition, the PUCCH signal may be configured based on PUCCH format 3, and the first SR and the second SR may be configured as one PUCCH signal. In this case, positions at which an information bit of the first SR and an information bit of the second SR are inserted may be fixed.

In another aspect of the present invention, provided herein is a method for transmitting scheduling request (SR) by a user equipment in a wireless access system for supporting a multi-connectivity mode, the method including receiving a higher layer signal including a SR parameter for SR transmission from a first small cell in the multi-connectivity mode, generating the SR based on the SR parameter, and transmitting the SR using a physical uplink control channel (PUCCH) signal. In this case, the SR parameter may be set via pre-negotiation with the first small cell and a second small cell in the multi-connectivity mode, the UE may maintain a plurality of connection with two or more small cells including the first small cell and the second small cell in the multi-connectivity mode, and the first small cell and the second small cell may be connected to each other via a non-ideal backhaul link.

The higher layer signal may further include a virtual cell identifier (VCI) used in the multi-connectivity mode, and the PUCCH signal may be transmitted based on the VCI.

The SR may be received from both the first small cell and the second small cell.

The method may further include receiving first uplink grant and second uplink grant including uplink scheduling information in response to the SR from the first small cell and the second small cell, respectively, selecting a small cell to which a physical uplink shared channel (PUSCH) signal is to be transmitted, and transmitting the PUSCH signal to the selected small cell.

The UE may select the small cell to which the PUSCH signal is to be transmitted based on one of a physical cell identifier (PCI) and a serving cell index (ScellIndex) of the small cells.

The first small call and the second small cell that receive the SR may determine a small cell that performs scheduling on the UE, and the determined small cell may transmit uplink grant including uplink scheduling information to the UE.

The SR may be joint-encoded and transmitted with an Acknowledgement/Negative Acknowledgement (ACK/NACK) signal to one or more of the first small cell and the second small cell.

In another aspect of the present invention, provided herein is a user equipment (UE) for transmitting scheduling request (SR) in a wireless access system for supporting a multi-connectivity mode, the UE including a transmitter, a receiver, and a processor that is operatively associated with the transmitter and the receiver so as to support SR transmission, wherein the receiver is configured to receive a higher layer signal including a SR parameter for the SR transmission from a first small cell in the multi-connectivity mode, the processor is configured to generate the SR based on the SR parameter, the transmitter is configured to transmit the SR using a physical uplink control channel (PUCCH) signal, the SR parameter is set via pre-negotiation with the first small cell and a second small cell in the multi-connectivity mode, the UE maintains a plurality of connection with two or more small cells including the first small cell and the second small cell in the multi-connectivity mode, and the first small cell and the second small cell are connected to each other via a non-ideal backhaul link.

The higher layer signal may further include a virtual cell identifier (VCI) used in the multi-connectivity mode, and the PUCCH signal may be transmitted based on the VCI. Accordingly, the SR may be received from both the first small cell and the second small cell.

The receiver may be configured to receive first uplink grant and second uplink grant including uplink scheduling information in response to the SR from the first small cell and the second small cell, respectively, the processor may be configured to select a small cell to which a physical uplink shared channel (PUSCH) signal is to be transmitted, and the transmitter may be configured to transmit the PUSCH signal to the selected small cell.

The processor may select the small cell to which the PUSCH signal is to be transmitted based on one of a physical cell identifier (PCI) and a serving cell index (ScelIndex) of the small cells.

The first small call and the second small cell that receive the SR may determine a small cell that performs scheduling on the UE, and the determined small cell may transmit uplink grant including uplink scheduling information to the UE.

The SR may be joint-encoded and transmitted with an Acknowledgement/Negative Acknowledgement (ACK/NACK) signal to one or more of the first small cell and the second small cell.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

First, it is possible to efficiently transmit scheduling request (SR) in a multi-connectivity mode in which a UE is connected to a plurality of cells.

Second, it is possible to transmit SR to a plurality of small cells without collision by setting SR parameters between a plurality of small cells so as not to overlap each other in a multi-connectivity mode.

Third, it is possible to receive uplink (UL) grant from small cells in a multi-connectivity mode without collision and to transmit UL data without degradation in PAPR and CM performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 2 is a diagram illustrating a structure of a radio frame for use in the embodiments.

FIG. 4 is a diagram illustrating a structure of an uplink subframe according to the embodiments.

FIG. 10 illustrates ACK/NACK channelization for PUCCH formats 1a and 1b.

Figure 21:
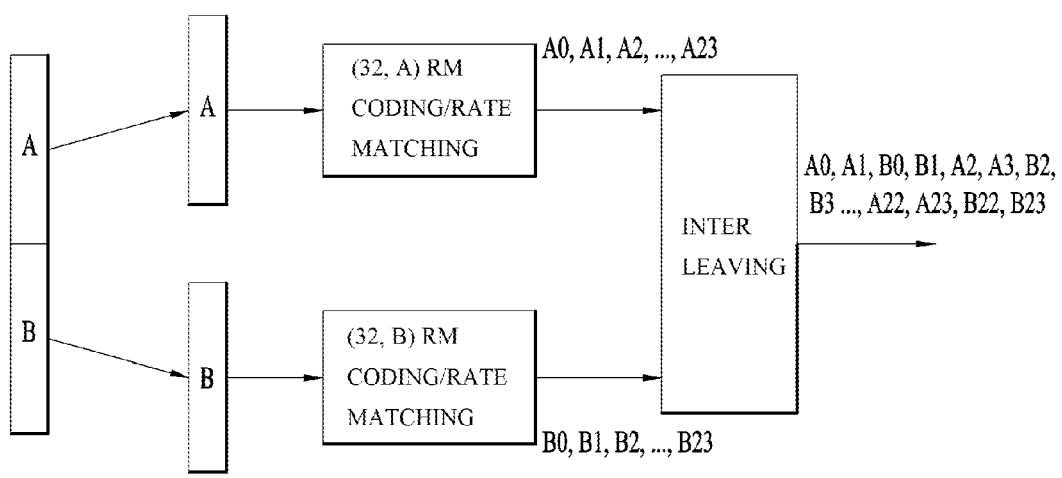
FIG. 21 is a diagram illustrating one of methods for transmitting SR using PUCCH format 3.
Figure 22:
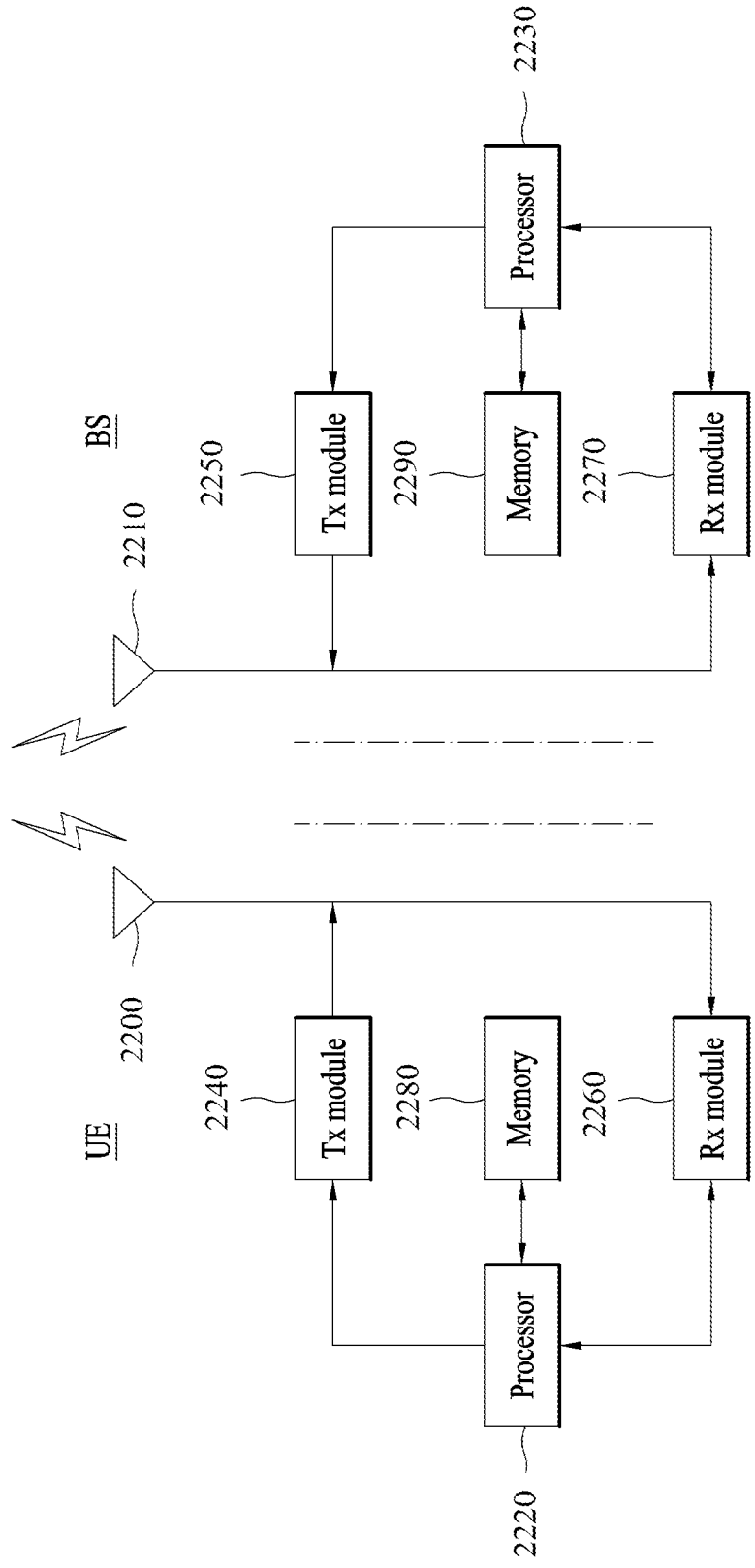

Apparatuses illustrated in FIG. 22 are means that can implement the methods described before with reference to FIGS. 1 to 21.

BEST MODE

The following embodiments of the present invention provide methods for transmitting channel status information (CSI) in an environment, in which a user equipment (UE) is connected to two or more small cells, and devices supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems which are examples of a wireless access system which can be applied to embodiments to the present invention will be explained.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

Figure 1:
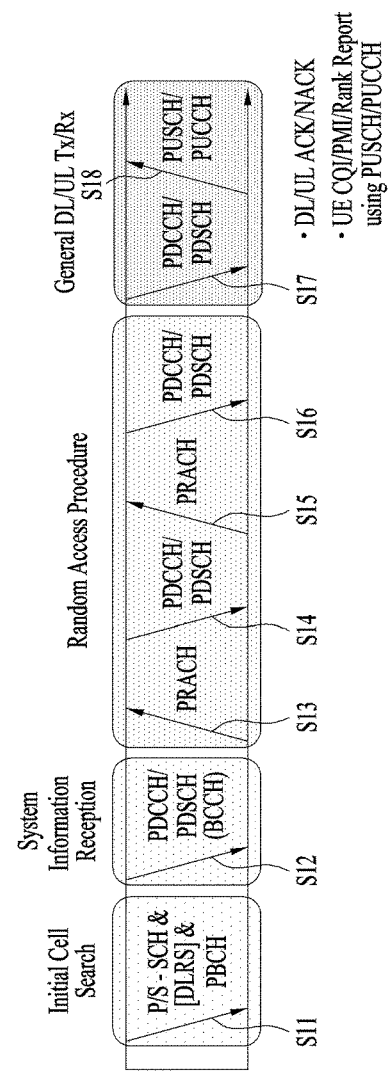
FIG. 1 is a conceptual diagram illustrating physical channels used in the embodiments and a signal transmission method using the physical channels.

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

FIG. 2 illustrates exemplary radio frame structures used in embodiments of the present disclosure.

FIG. 2(*a*) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(*b*) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
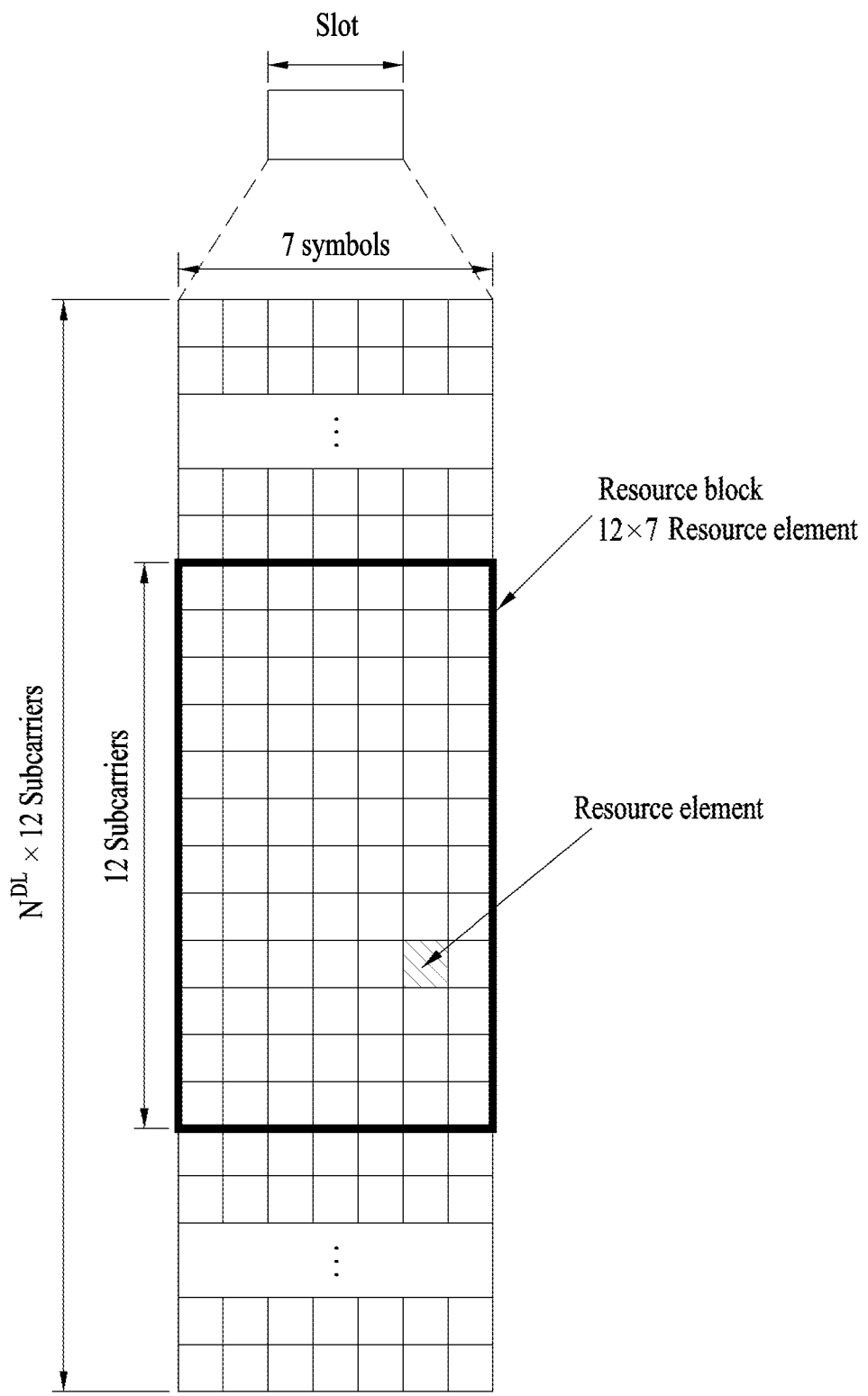
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
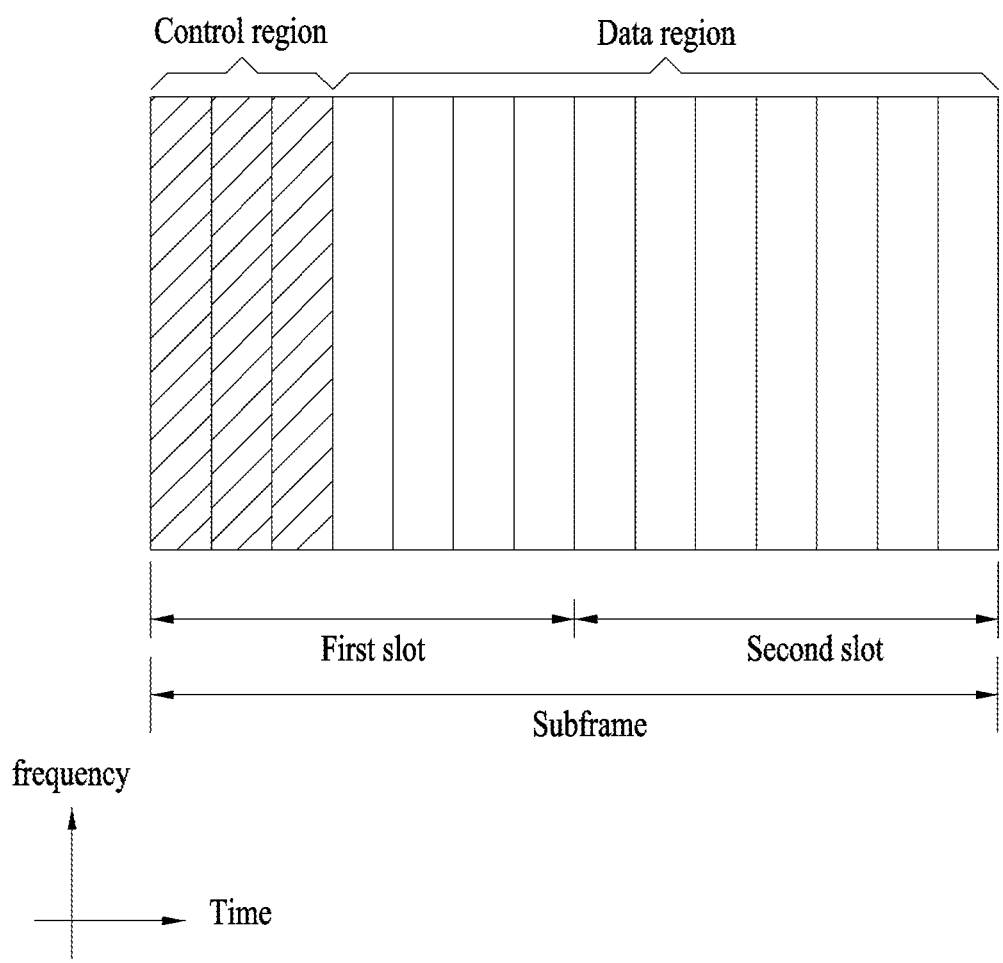
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4

REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ $(=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |

TABLE 3-continued

| DCI Format | Description |
|---|---|
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which does not based on a codebook (Rel-8);

(8) Transmission mode 8: Precoding supporting up to two layers, which do not based on a codebook (Rel-9);

(9) Transmission mode 9: Precoding supporting up to eight layers, which do not based on a codebook (Rel-10); and

(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$ $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

where $Y_{-1} = n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission

1) Format 1a: BPSK ACK/NACK for 1 codeword

2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment Table 6 shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| PUCCH format | SC-FDMA symbol location of RS | |
|---|---|---|
| | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
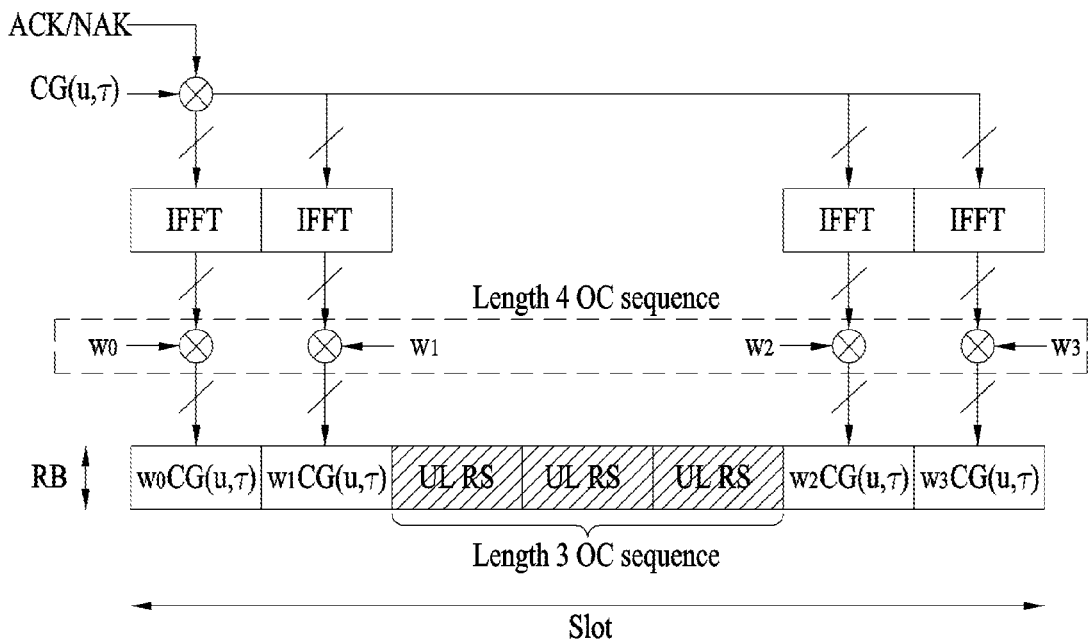
FIG. 6 illustrates PUCCH formats 1a and 1b for use in a normal cyclic prefix (CP) case.
Figure 7:
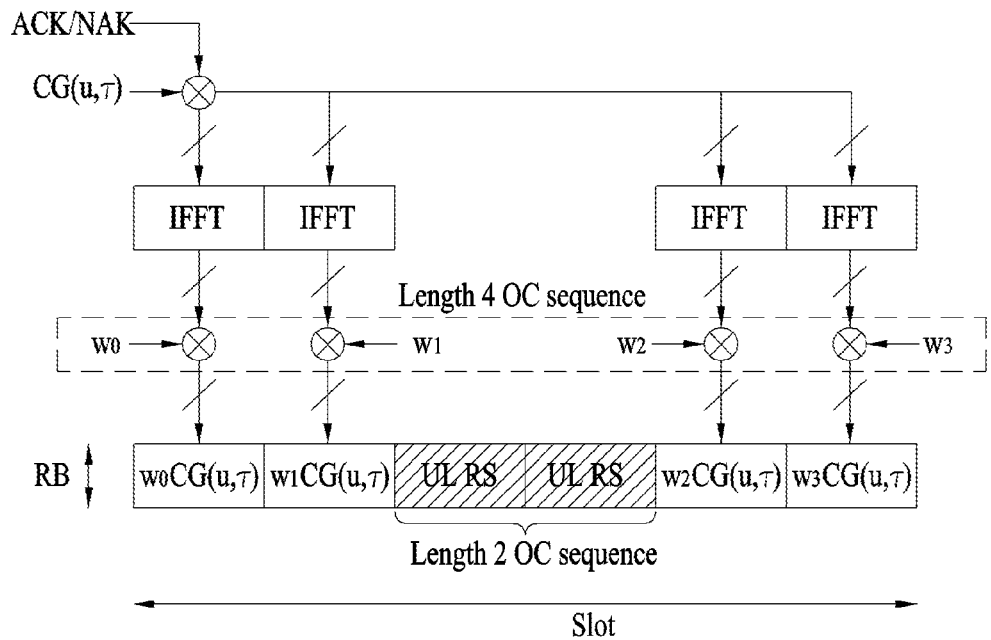
FIG. 7 illustrates PUCCH formats 1a and 1b for use in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each user equipment, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18 user equipments may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a user equipment through RRC (radio resource control. For non-persistent scheduling with dynamic ACK/NACK, the ACK/NACK resource may be implicitly allocated to a user equipment using a smallest CCE index of PDCCH corresponding to PDSCH.

Length-4 orthogonal sequence (OC) and length-3 orthogonal sequence for PUCCH format 1/1a/1b are shown in Table 9 and Table 10, respectively.

TABLE 9

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 10

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) $[\overline{w}(0) \ldots \overline{w}(N_{RS}^{PUCCH}-1)]$ for a reference signal in PUCCH format 1/1a/1b is shown in Table 11.

TABLE 11

| Sequence index $\overline{n}_{oc}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
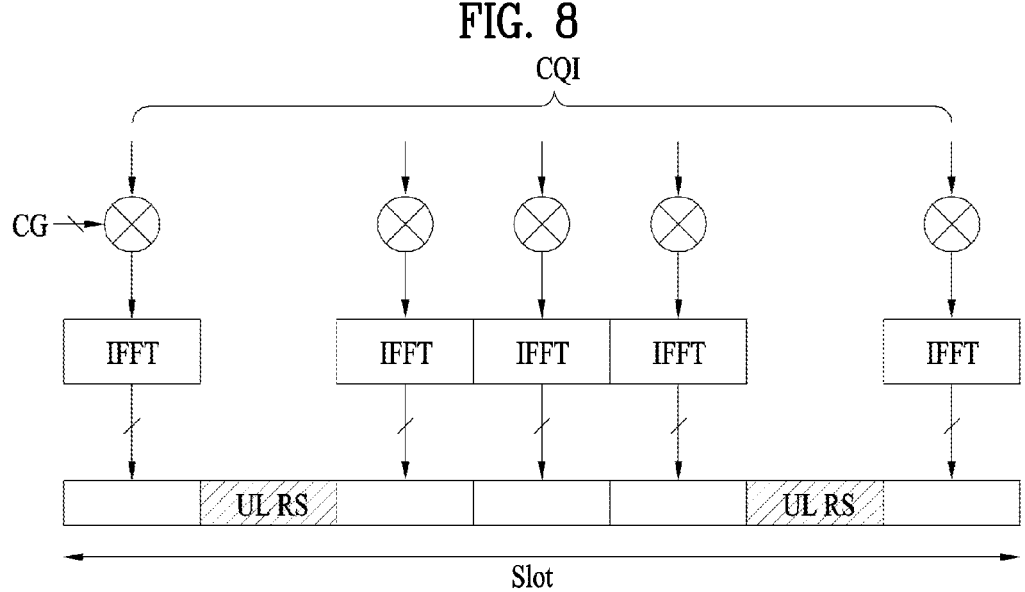
FIG. 8 illustrates PUCCH formats 2/2a/2b in a normal cyclic prefix (CP) case.

FIG. 8 shows PUCCH format 2/2a/2b in case of a normal cyclic prefix. And, FIG. 9 shows PUCCH format 2/2a/2b in case of an extended cyclic prefix.

Figure 9:
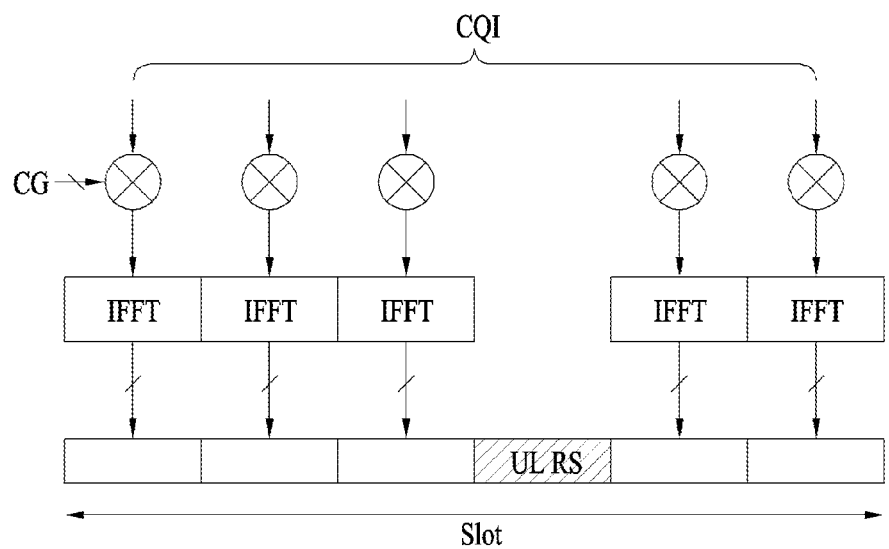
FIG. 9 illustrates PUCCH formats 2/2a/2b in an extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 user equipments may be multiplexed in the same PRB.

For instance, assuming that the number of available CSs is 6, 6 user equipments may be multiplexed in the same PRB. In brief, a plurality of user equipments in PUCCH format 1/1a/1b and PUCCH format 2/2a/2b may be multiplexed by 'CS+OC+PRB' and ' CS+PRB', respectively.

Figure 11:
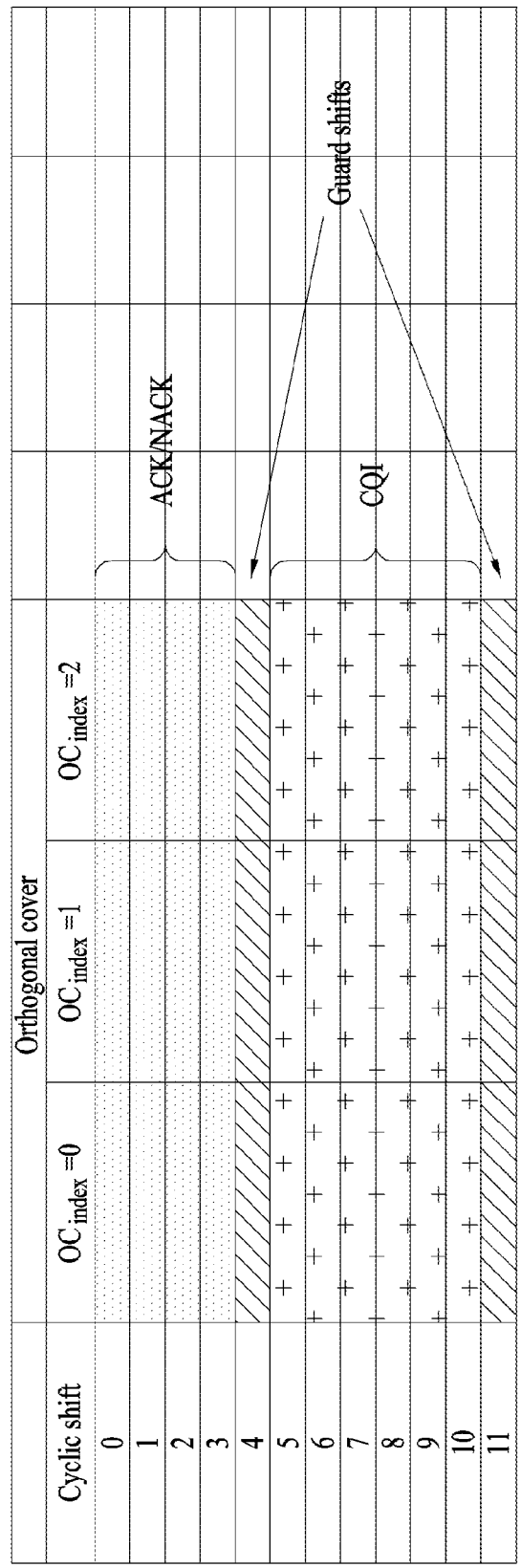
FIG. 11 illustrates channelization for a hybrid structure of PUCCH format 1a/1b and format 2/2a/2b in the same PRB.

FIG. 10 is a diagram of ACK/NACK channelization for PUCCH formats 1a and 1b. In particular, FIG. 10 corresponds to a case of '$\Delta_{shift}^{PUCCH}=2$', FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference
(2) Slot level CS/OC remapping
 1) For inter-cell interference randomization
 2) Slot based access for mapping between ACK/NACK channel and resource (k)

Meanwhile, resource $n_r$ for PUCCH format 1/1a/1b may include the following combinations.

(1) CS(=equal to DFT orthogonal code at symbol level) ($n_{cs}$)
(2) OC (orthogonal cover at slot level) ($n_{oc}$)
(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$ and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0, a_1, a_2, a_3, \ldots, a_{A-1}$ may be coded using (20, A) RM code. In this case, $a_0$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 1 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Formula 1.

$$b_i = \sum_{n=1}^{A-1} (a_n \cdot M_{i,n}) \bmod 2 \quad \text{[Formula 3]}$$

In Formula 3, 'i=0, 1, 2, . . . , B-1' is met.

In case of wideband repots, a bandwidth of UCI (uplink control information) field for CQI/PMI can be represented as Tables 8 to 10 in the following.

Table 13 shows UCI (Uplink Control Information) field for broadband report (single antenna port, transmit diversity) or open loop spatial multiplexing PDSCH CQI feedback.

TABLE 13

| Field | Bandwidth |
|---|---|
| Broadband CQI | 4 |

Table 14 shows UL control information (UCI) field for CQI and PMI feedback in case of wideband reports (closed loop spatial multiplexing PDSCH transmission).

TABLE 14

| Field | Bandwidth | | | |
|---|---|---|---|---|
| | 2 antenna ports | | 4 antenna ports | |
| | rank = 1 | rank = 2 | rank = 1 | Rank >1 |
| Wideband CQI | 4 | 4 | 4 | 4 |
| Spatial differential CQI | 0 | 3 | 0 | 3 |
| Precoding Matrix Indication | 2 | 1 | 4 | 4 |

Table 15 shows UL control information (UCI) field for RI feedback in case of wideband reports.

TABLE 15

| Field | Bit widths | | |
|---|---|---|---|
| | 2 antenna ports | 4 antenna ports | |
| | | Max. 2 layers | Max. 4 layers |
| Rank Indication | 1 | 1 | 2 |

Figure 12:
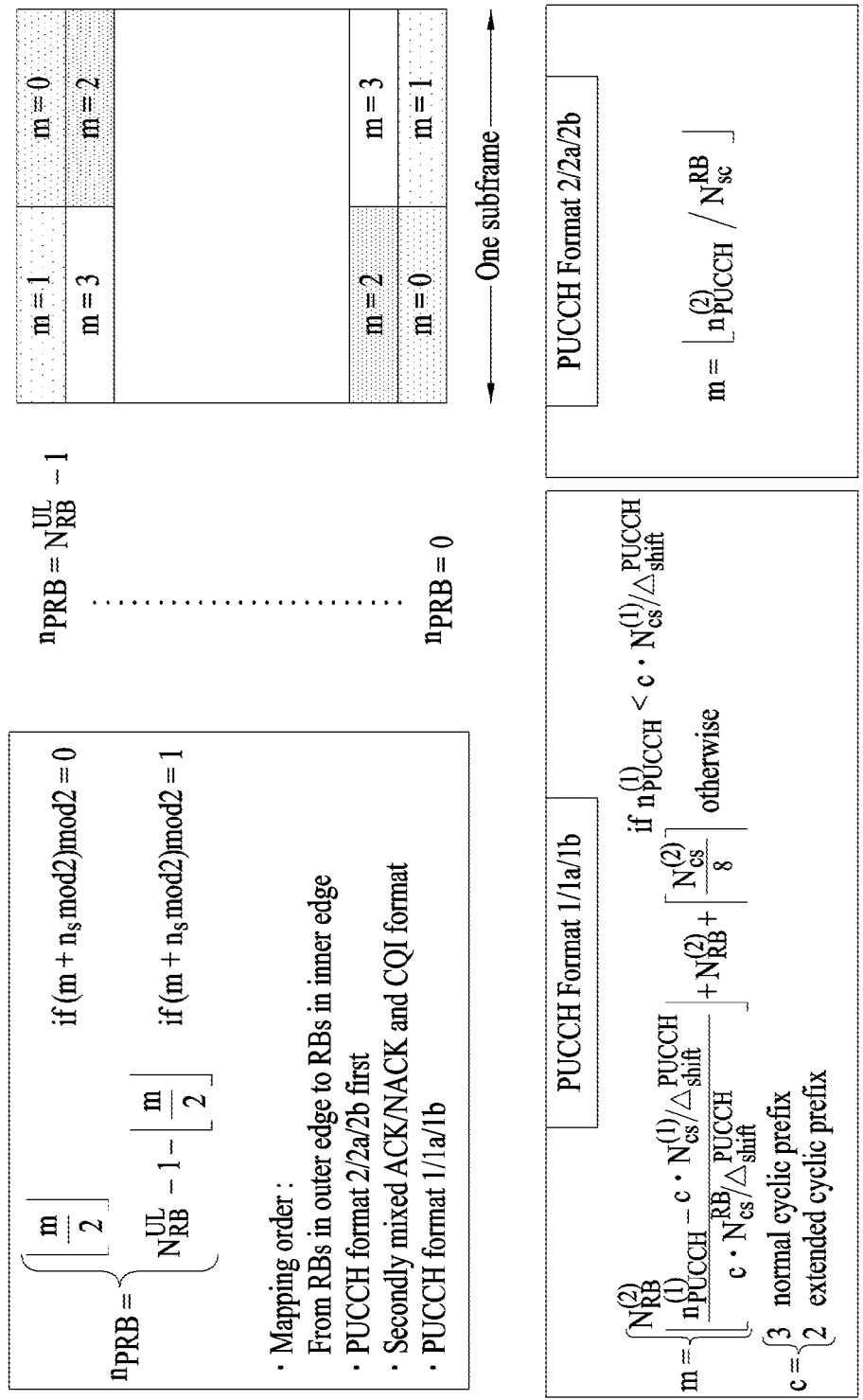
FIG. 12 illustrates allocation of a physical resource block (PRB).
Figure 20:
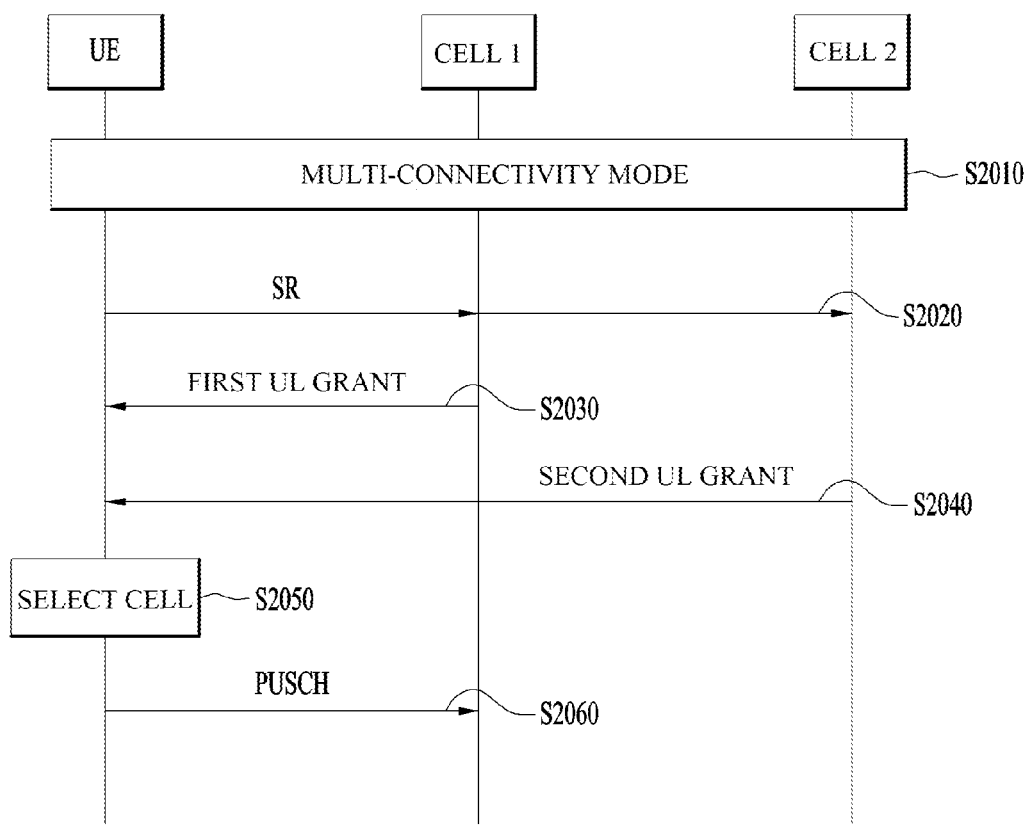
FIG. 20 is a diagram illustrating another method for transmitting UL grant in a multi-connectivity mode.

FIG. 12 is a diagram for PRB allocation. Referring to FIG. 20, PRB may be usable for PUCCH transmission in a slot $n_s$.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
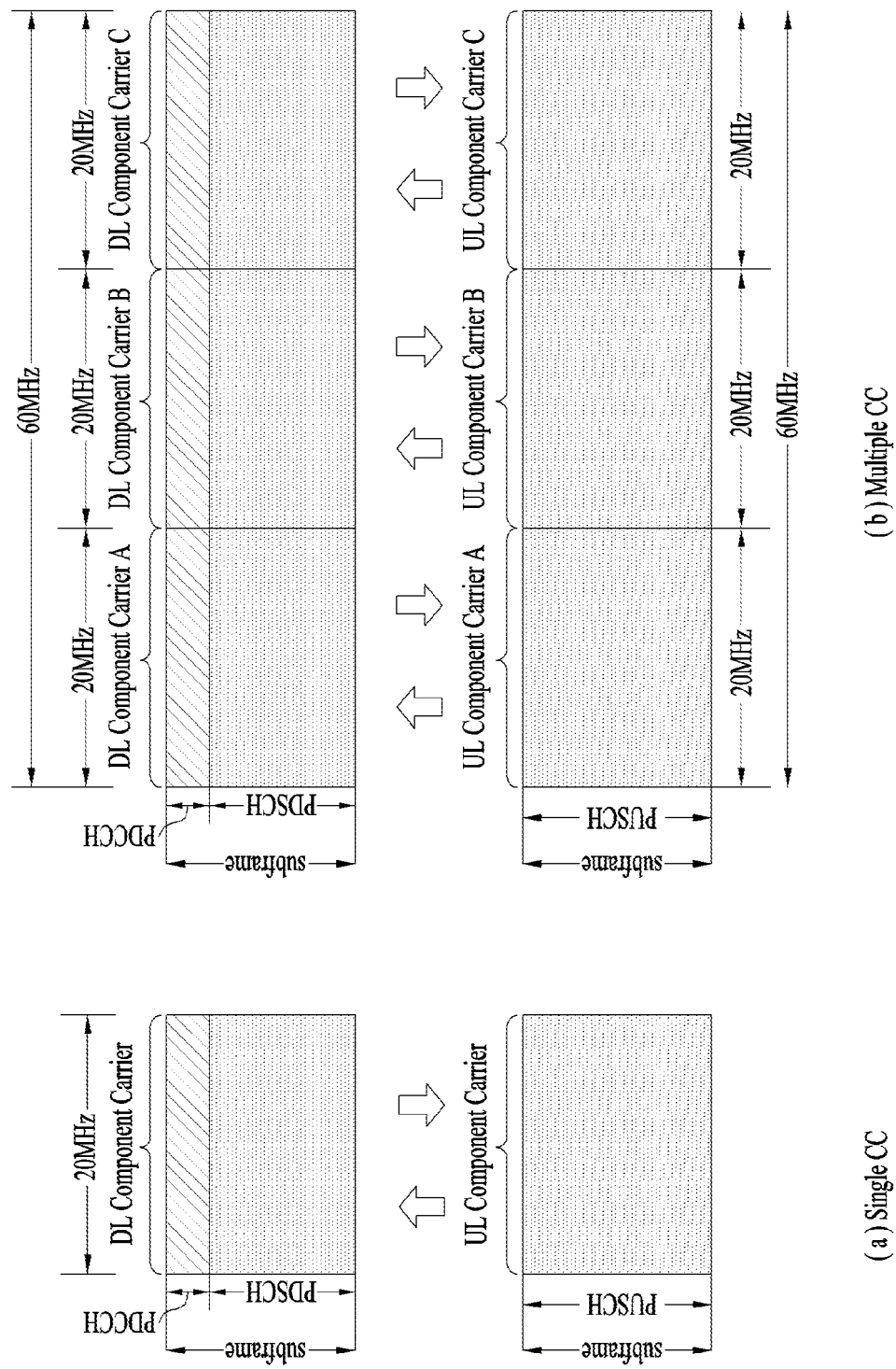
FIG. 13 is a diagram illustrating an example of a component carrier (CC) of the embodiments and carrier aggregation (CA) used in an LTE_A system.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
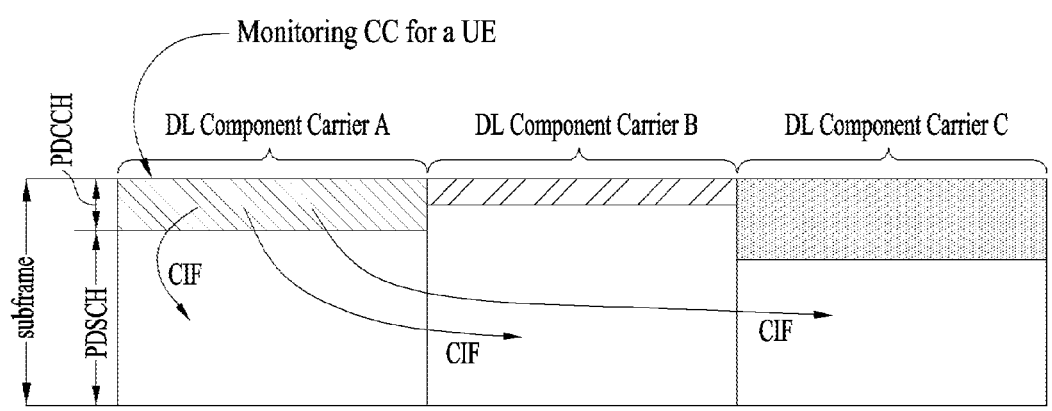
FIG. 14 illustrates a subframe structure of an LTE-A system according to cross-carrier scheduling.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
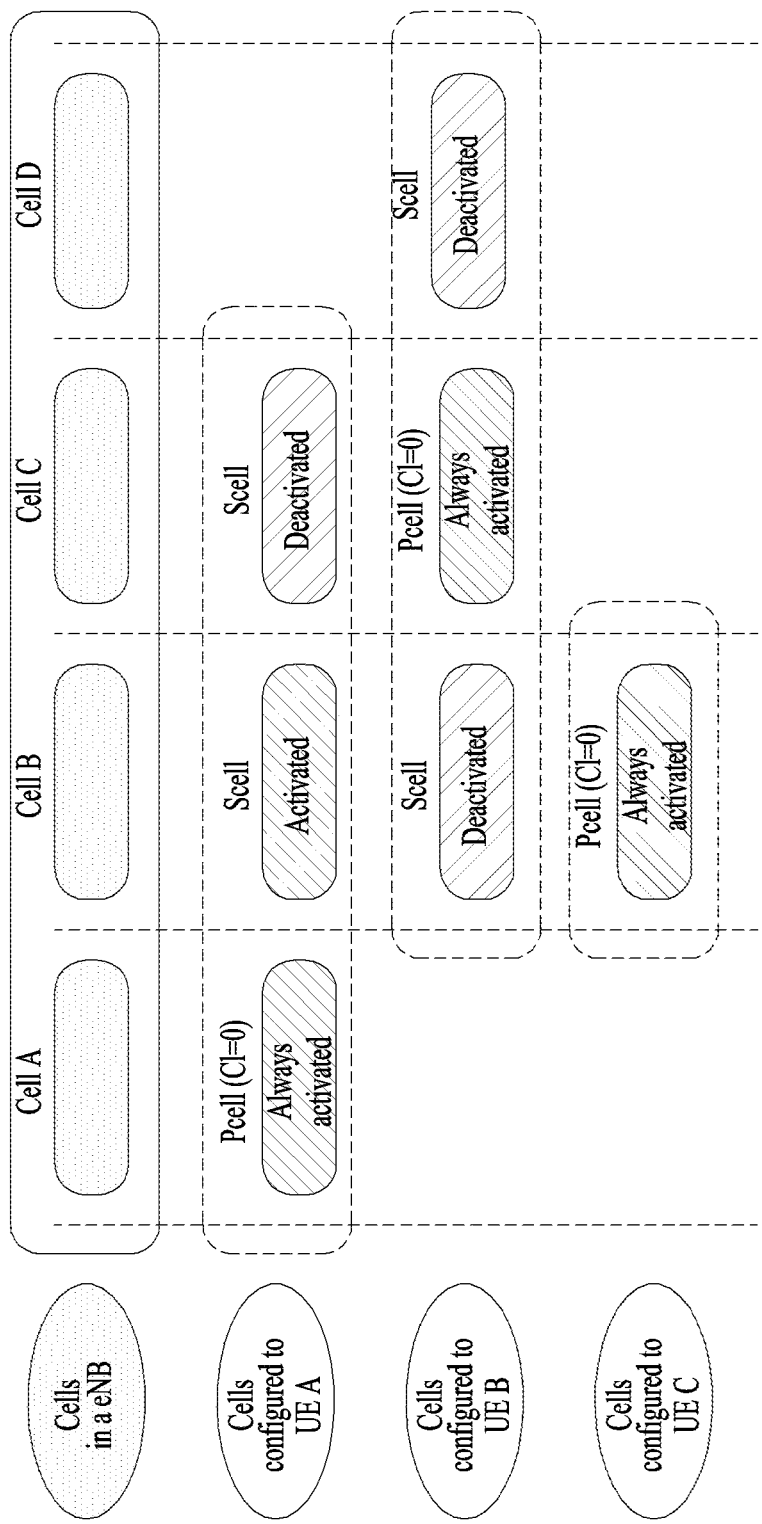
FIG. 15 is conceptual diagram illustrating a construction of serving cells according to cross-carrier scheduling.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 15 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA PUCCH (Carrier Aggregation Physical Uplink Control Channel)

In a wireless communication system supportive of carrier aggregation, PUCCH format for feeding back UCI (e.g., multi-ACK/NACK bit) can be defined. For clarity of the following description, such PUCCH format shall be named CA PUCCH format.

Figure 16:
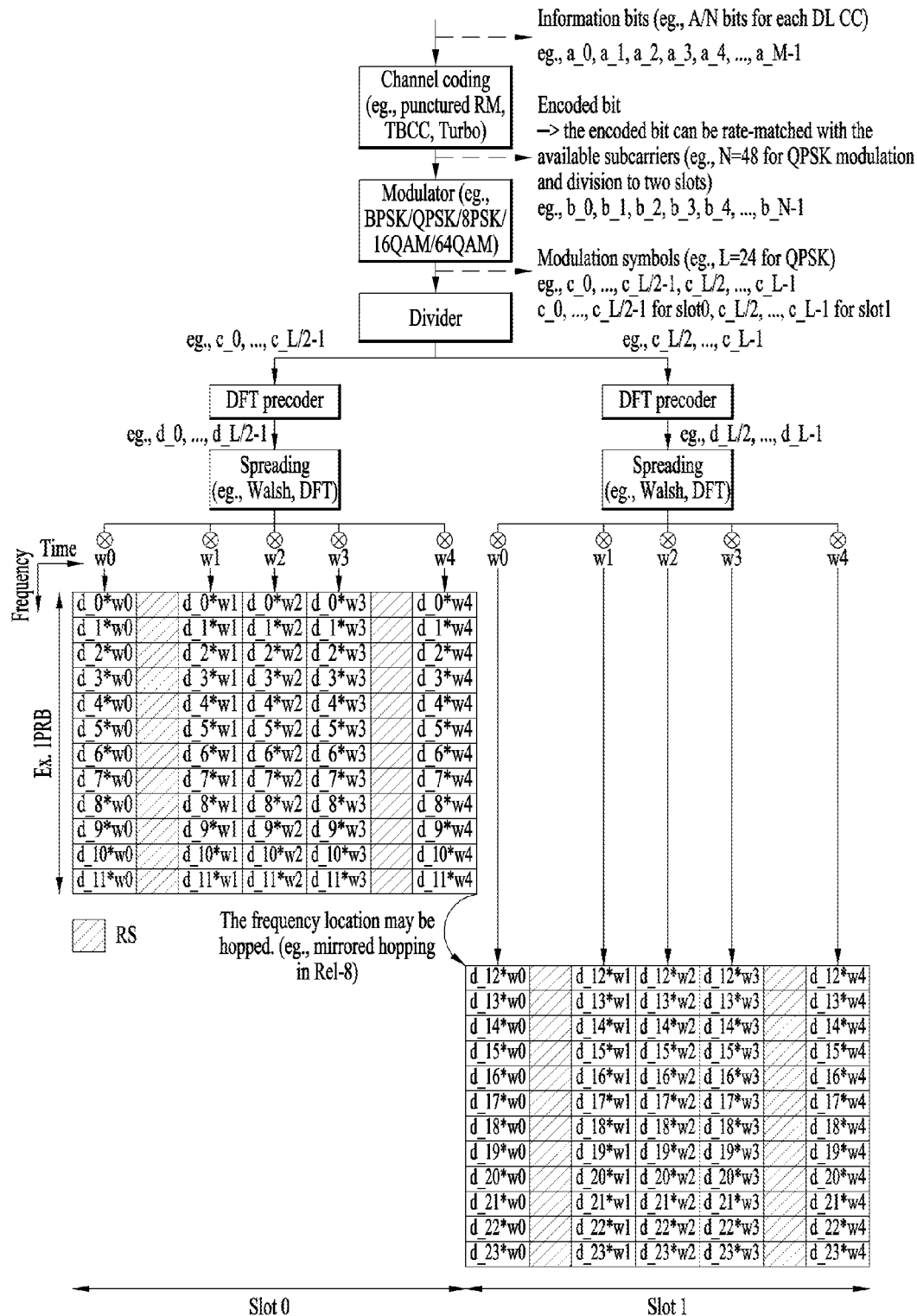
FIG. 16 is a conceptual diagram illustrating CA PUCCH signal processing.

FIG. 16 is a diagram for one example of a signal processing process of CA PUCCH.

Referring to FIG. 16, a channel coding block generates coding bits (e.g., encoded bits, coded bits, etc.) (or codeword) $b\_0, b\_1, \ldots$ and $b\_N-1$ by channel-coding information bits $a\_0, a\_1, \ldots$ and $a\_M-1$ (e.g., multiple ACK/NACK bits). In this case, the M indicates a size of information bits and the N indicates a size of the coding bits. The information bits may include multiple ACK/NACK for UL control information (UCI), e.g., a plurality of data (or PDSCH) received via a plurality of DL CCS. In this case, the information bits $a_0, a\_1, \ldots a\_M-1$ may be joint-coded irrespective of type/number/size of the UCI configuring the information bits. For instance, in case that information bits include multiple ACK/NACK for a plurality of DL CCs, channel coding may not be performed per DL CC or individual ACK/NACK bit but may be performed on all bit information, from which a single codeword may be generated. And, channel coding is non-limited by this. Moreover, the channel coding may include one of simplex repetition, simplex coding, RM (Reed Muller) coding, punctured RM coding, TBCC (tail-biting convolutional coding), LDPC (low-density parity-check), turbo coding and the like. Besides, coding bits may be rate-matched in consideration of a modulation order and a resource size (not shown in the drawing). A rate matching function may be included as a part of the channel coding block or may be performed via a separate function block.

A modulator generates modulated symbols $c\_0, c\_1 \ldots c\_L-1$ by modulating coding bits $b\_0, b\_1 \ldots b\_N-1$. In this case, the L indicates a size of modulated symbol. This modulation scheme may be performed in a manner of modifying a size and phase of a transmission signal. For instance, the modulation scheme may include one of n-PSK (Phase Shift Keying), n-QAM (Quadrature Amplitude Modulation) and the like, where n is an integer equal to or greater than 2. In particular, the modulation scheme may include one of BPSK (Binary PSK), QPSK (Quadrature PSK), 8-PSK, QAM, 16-QAM, 64-QAM and the like.

A divider divides the modulated symbols $c\_0, c\_1 \ldots c\_L-1$ to slots, respectively. A sequence/pattern/scheme for dividing the modulated symbols to the slots may be specially non-limited. For instance, the divider may be able to divide the modulated symbols to the corresponding slots in order from a head to tail (Localized scheme). In doing so, as shown in the drawing, the modulated symbols $c\_0, c\_1 \ldots c\_L/2-1$ may be divided to the slot 0 and the modulated symbols $c\_L/2, c\_L/2+1 \ldots c\_L-1$ may be divided to the slot 1. Moreover, the modulated symbols may be divided to the corresponding slots, respectively, by interleaving or permutation. For instance, the even-numbered modulated symbol may be divided to the slot 0, while the odd-numbered modulated symbol may be divided to the slot 1. The modulation scheme and the dividing scheme may be switched to each other in order.

A DFT precoder may perform DFT precoding (e.g., 12-point DFT) on the modulated symbols divided to the corresponding slots to generate a single carrier waveform. Referring to the drawing, the modulated symbols $c\_0, c\_1 \ldots c\_L/2-1$ divided to the corresponding slot 0 may be DFT-precoded into DFT symbols $d\_0, d\_1 \ldots d\_L/2-1$, and the modulated symbols $c\_L/2, c\_L/2+1 \ldots c\_L-1$ divided to the slot 1 may be DFT-precoded into DFT symbols $d\_L/2, d\_L/2+1 \ldots d\_L-1$. Moreover, the DFT precoding may be replaced by another linear operation (e.g., Walsh precoding) corresponding thereto.

A spreading block may spread the DFT-performed signal at SC-FDMA symbols level (e.g., time domain). The time-domain spreading at the SC-FDMA level may be performed using a spreading code (sequence). The spreading code may include pseudo orthogonal code and orthogonal code. The pseudo orthogonal code may include PN (pseudo noise) code, by which the pseudo orthogonal code may be non-limited. The orthogonal code may include Walsh code and DFT code, by which the orthogonal code may be non-limited. The orthogonal code (OC) may be interchangeably used with one of an orthogonal sequence, an orthogonal cover (OC) and an orthogonal cover code (OCC). In this specification, for example, the orthogonal code may be mainly described as a representative example of the spreading code for clarity and convenience of the following description. Optionally, the orthogonal code may be substituted with the pseudo orthogonal code. A maximum value of a spreading code size (or a spreading factor: SF) may be limited by the number of SC-FDAM symbols used for control information transmission. For example, in case that 5 SC-FDMA symbols are used in one slot for control information transmission, orthogonal codes (or pseudo orthogonal codes) w0, w1, w2, w3 and w4 of length 5 may be used per slot. The SF may mean a spreading degree of the control information and may be associated with a multiplexing order or an antenna multiplexing order of a user equipment. The SF may be variable like 1, 2, 3, 4, 5 . . . depending on a requirement of a system. The SF may be defined in advance between a base station and a user equipment. And, the SF may be notified to a user equipment via DCI or RRC signaling.

The signal generated through the above-described process may be mapped to subcarrier within the PRB and may be then transformed into a time-domain signal through IFFT. CP may be attached to the time-domain signal. The generated SC-FDMA symbol may be then transmitted through an RF stage.

2.4 Periodic UCI Reporting Using PUCCH

In an LTE-A system (e.g., Rel-10, 11, 12, etc.), transmission of a plurality of ACK/NACK signals for a plurality of PDSCH signals, which is transmitted via a plurality of DL CCs, via a specific UL CC is considered. Unlike ACK/NACK transmission using PUCCH format 1a/1b of an LTE system, a plurality of ACK/NACK signals may be subjected to channel coding (e.g., Reed-Muller coding, Tail-biting convolutional coding, etc.) and then a plurality of ACK/NACK information/signals may be transmitted using PUCCH format 2 or a new PUCCH format (e.g., an E-PUCCH format) modified based on block spreading.

Figure 17:
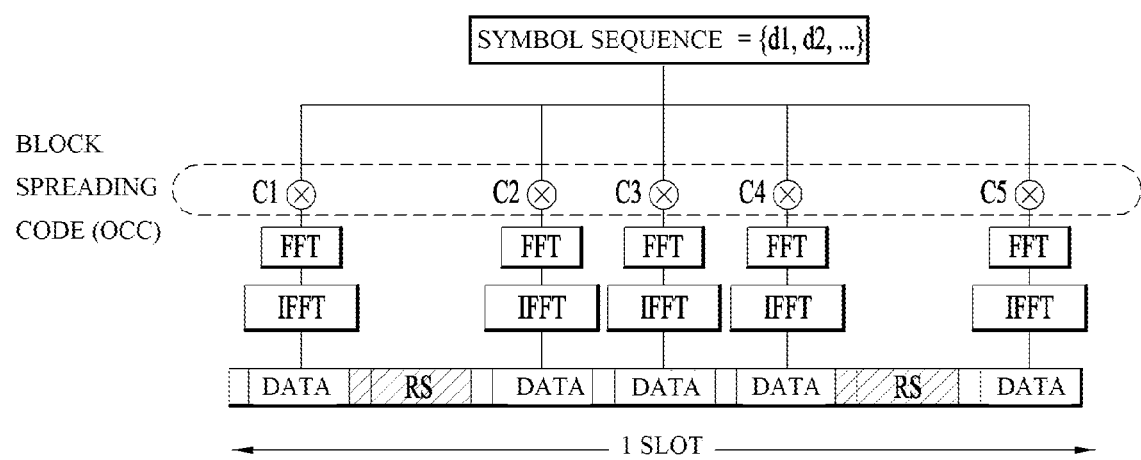
FIG. 17 is a diagram showing an example of a new PUCCH format based on block spreading.

FIG. 17 shows an example of a new PUCCH format based on block spreading.

A block spreading scheme refers to a method for performing modulation using an SC-FDMA scheme unlike PUCCH format series 1 or 2 in an LTE system. The block spreading scheme refers to a scheme for time-domain spreading and transmitting a symbol sequence using an orthogonal cover code (OCC) as shown in FIG. 17. That is, the symbol sequence is spread using the OCC to multiplex control signals of several UEs in the same RB.

In the above-described PUCCH format 2, one symbol sequence is transmitted over the time domain and UE multiplexing is performed using cyclic shift (CCS) of a CAZAC sequence. However, in the new PUCCH format based on block spreading, one symbol sequence is transmitted over the frequency domain and UE multiplexing is performed using time-domain spreading based on an OCC.

For example, as shown in FIG. 17, one symbol sequence may be generated as five SC-FDMA symbols by an OCC of length-5 (that is, SF=5). Although a total of 2 RS symbols is used during one slot in FIG. 17, various methods using three RS symbols and using an OCC of SF=4 may be used. At this time, the RS symbols may be generated from a CAZAC sequence having specific cyclic shift and may be transmitted in the form in which a specific OCC is applied (multiplied by) to a plurality of RS symbols of the time domain.

In the embodiments of the present invention, for convenience of description, a multi-ACK/NACK transmission scheme based on channel coding using PUCCH format 2 or a new PUCCH format (e.g., an E-PUCCH format) is defined as a "multi-bit ACK/NACK coding transmission method".

The multi-bit ACK/NACK coding method refers to a method for transmitting ACK/NACK code blocks generated by channel-coding ACK/NACK or DTX information (meaning that the PDCCH is not received/detected) for PDSCH signals transmitted on a plurality of DL CCs.

For example, when the UE operates on a certain DL CC in an SU-MIMO mode and receives two codewords (CW), the UE may have a maximum of five feedback states including a total of four feedback states of each CW, such as ACK/ACK, ACK/NACK, NACK/ACK and NACK/NACK, and DTX. When the UE receives a single CW, the UE may have a maximum of three states including ACK, NACK and/or DTX. When NACK and DTX are equally processed, the UE may have a total of two states such as ACK and NACK/DTX.

Accordingly, when the UE aggregates a maximum of five DL CCs and the UE operates on all DL CCs in an SU-MIMO mode, the UE may have a maximum of 55 transmittable feedback states. At this time, the size of ACK/NACK payload representing the 55 feedback states may be a total of 12 bits. If DTX and NACK are equally processed, the number of feedback states becomes 45 and the size of the ACK/NACK payload representing the feedback states is a total of 10 bits.

In an ACK/NACK multiplexing (that is, ACK/NACK selection) method applied to an LTE TDD system, fundamentally, an implicit ACK/NACK selection method in which an implicit PUCCH resource corresponding to a PDCCH scheduling each PDSCH (that is, linked to a smallest CCE index) is used for ACK/NACK transmission in order to secure a PUCCH resource of each UE.

In an LTE-A FDD system, transmission of a plurality of ACK/NACK signals for a plurality of PDSCH signals transmitted via a plurality of DL CCs via one UE-specific UL CC is considered. "ACK/NACK selection" methods using an implicit PUCCH resource linked to a PDCCH scheduling some or all DL CCs (that is, linked to a smallest CCE index nCCE or linked to nCCE and nCCE+1) or a combination of an implicit PUCCH and an explicit PUCCH resource pre-allocated to each UE via RRC signaling are considered.

Even in an LTE-A TDD system, aggregation of a plurality of CCs is considered. For example, when a plurality of CCs is aggregated, UE transmitting a plurality of ACK/NACK information/signals for a plurality of PDSCH signals transmitted via a plurality of DL subframes and a plurality of CCs via a specific CC (that is, A/N CC) in UL subframes corresponding to the plurality of DL subframes in which the PDSCH signals are transmitted is considered.

At this time, unlike LTE-A FDD, a method (that is, full ACK/NACK) for transmitting a plurality of ACK/NACK signals corresponding to a maximum number of CWs, which may be transmitted via all CCs allocated to the UE, for a plurality of DL subframes may be considered or a method (that is, bundled ACK/NACK) for applying ACK/NACK bundling to a CW, CC and/or a subframe region, reducing the number of transmitted ACKs/NACKs and performing transmission may be considered.

At this time, CW bundling means that ACK/NACK bundling for CW per CC is applied to each DL subframe and CC bundling means that ACK/NACK bundling for all or some CCs is applied to each DL subframe. In addition, subframe bundling means that ACK/NACK bundling for all or some DL subframes is applied to each CC.

As the subframe bundling method, an ACK counter method indicating a total number of ACKs (or the number of some ACKs) per CC for all PDSCH signals or DL grant PDCCHs received on each DL CC may be considered. At this time, the multi-bit ACK/NACK coding scheme or the ACK/NACK transmission scheme based on the ACK/NACK selection method may be configurably applied according to the size of the ACK/NACK payload per UE, that is, the size of the ACK/NACK payload for transmission of full or bundled ACK/NACK configured per UE.

2.5 SR Transmission in LTE/LTE-A System

Scheduling request (SR) is a signal for requesting an eNB for scheduling by a UE when the UE has uplink data to be transmitted. For SR transmission of the UE, PUCCH are allocated and SR transmission is performed using an on-off keying method. For example, the UE may use PUCCH resources only when transmitting SR and may not use PUCCH resources when the UE does not transmit SR.

The eNB that receives the SR transmitted from the UE may transmit UL grant containing scheduling information to the UE through a PDCCH to transmit a PUSCH. SR may be configured to be transmitted in a specific substrate at a predetermined period through subframe offset. Accordingly, when the UE cannot receive UL grant of SR from the eNB in an SR subframe of a subsequent period, the UE may re-transmit SR to the eNB.

In addition, ACK/NACK and SR may be simultaneously transmitted. For example, in the case of negative SR, upon transmitting ACK/NACK through PUCCH format 1/1a/1b, the UE may transmit ACK/NACK using PUCCH resources reserved for ACK/NACK. In the case of positive SR, the UE may transmit ACK/NACK using PUCCH resources allocated for SR.

When the UE transmits ACK/NACK using PUCCH format 3, SR may be joint-encoded with ACK/NACK and transmitted using PUCCH resources determined for PUCCH format 3.

Hereinafter, a small-cell environment to which embodiments of the present invention are to be applied will be defined, and various methods for transmitting SR in the small-cell environment will be described.

3. SR Transmitting Method in Small Cell Environment 3.1 Small Cell Environment

The term "cell" described in the embodiments of the present invention may fundamentally include downlink resources and optionally include uplink resources (see Chapter 2.1). At this time, linkage between carrier frequency for downlink resources and carrier frequency for uplink resources is specified in system information (SI) delivered via downlink resources.

In addition, the term "cell" means a specific frequency region or a specific geographical region as coverage of an eNB. The term "cell may have the same meaning as the eNB supporting specific coverage, for convenience of description. For example, a macro eNB and a macro cell may be used as the same meaning and a small base station and a small cell may be used as the same meaning. The terms cell and base station may have respective original meanings upon being explicitly distinguished.

In a next-generation wireless communication system, in order to more stably secure a data service such as multimedia, interest in introduction of a hierarchical cell structure in which a micro cell, a pico cell and/or a femto cell, all of which are small cells for low-power/short-range communication, are mixed or a heterogeneous cell structure to a homogeneous network based on a macro cell has increased. This is because additional installation of a macro cell in an existing eNB can improve system performance but is not efficient in terms of cost and complexity.

Assume that the term "cell" applied to the following embodiments refers to a small cell unless stated otherwise. However, the present invention is applicable to a cell (e.g., a macro cell) used in a general cellular system.

In addition, the technologies described in Chapters 1 to 3 are applicable to the following embodiments of the present invention.

3.2 Multi-Connectivity Mode

In the embodiments of the present invention, a new connectivity mode is proposed. That is, a multi-connectivity mode in which a UE is simultaneously connected to two or more cells is proposed. The UE may be simultaneously connected to a plurality of cells having the same downlink carrier frequency or different downlink carrier frequencies in the multi-connectivity mode. The multi-connectivity mode may be referred to as a multi-connection mode, a new connectivity mode or a new connection mode as the connection mode newly proposed in the embodiments of the present invention.

The multi-connectivity mode means that the UE may be simultaneously connected to a plurality of cells. Hereinafter, for convenience of description, assume that the UE is connected to two cells. The present invention is equally applicable to the case in which the UE is connected to three or more cells.

For example, the UE may simultaneously receive services from a first cell and a second cell. At this time, the UE may receive functionalities (e.g., connection management, mobility management) provided by a control plane (C-plane) via the first cell and the second cell.

In addition, the UE may perform carrier aggregation (CA) with two or more cells. For example, the first cell may use n (n being an arbitrary positive integer) arbitrary carriers and the second cell may use k (k being an arbitrary positive integer) arbitrary carriers. At this time, the carriers of the first cell and the second cell are the same frequency carriers or different frequency carriers. For example, the first cell may use F1 and F2 frequency bands and the second cell may use F2 and F3 frequency bands.

A plurality of cells may physically exist in the same position or different positions. At this time, assume that the plurality of cells is connected to each other via a backhaul but the backhaul is a non-ideal backhaul via which it is difficult to share scheduling information or data of a specific UE due to very large transmission delay.

In the embodiments of the present invention, assume that the cell is a small cell. For example, as an environment in which the small cell is arranged, a hot spot of a city may be considered. That is, since a plurality of small cells is arranged in a specific region, assume that a difference in timing advance (TA) value between small cells, to which the UE is simultaneously connected, is small. That is, under a specific condition, several small cells may simultaneously receive the signal transmitted by the UE.

In the multi-connectivity mode, the UE may receive synchronization signals from a plurality of small cells and maintain downlink synchronization. In addition, the UE may receive several control signals such as PDCCH signals from the plurality of small cells and simultaneously or separately receive PDSCH signals, which are data, from the plurality of small cells. The UE may include one or more receivers for receiving data from the plurality of small cells. As such receivers, a minimum mean square error-interference rejection combining (MMSE-IRC) receiver for efficiently eliminating interference among the plurality of cells may be used. The UE may notify each cell of information about receiver performance in an initial cell connection step of each cell.

The signal received via the MMSE-IRC receiver may be expressed as shown in Equation 4 below. At this time, a system using $N_{TX}$ transmit antennas and $N_{RX}$ receive antennas is assumed.

$$r(k, l) = H_1(k, l)d_1(k, l) + \sum_{j=2}^{N_{BS}} H_j(k, l)d_j(k, l) + n(k, l) \quad \text{[Equation 4]}$$

In Equation 4, k means a k-th subcarrier of a specific subframe and l means a l-th OFDM symbol. In Equation 4 below, $H_1(k,l)d_1(k,l)$ denotes a preferred signal received by the UE and $H_j(k,l)d_j(k,l)$ denotes an interference signal transmitted from a j-th (j>1) eNB. At this time, $H_1(k,l)$ and $H_j(k,l)$ respectively mean estimated radio channels, $d_j(k,l)$ denotes a $N_{Tx} \times 1$ transmission data vector and n(k,l) denotes noise. $\hat{d}_j(k,l)$ is a restored data signal when rank is $N_{stream}$ and may be expressed as shown in Equation 5 below.

$$\hat{d}_j(k,l) = W_{RX,1}(k,l) r(k,l) \qquad \text{[Equation 5]}$$

In Equation 5, $W_{RX,1}(k,l)$ denotes a $N_{stream} \times N_{Rx}$ receiver weight matrix. In the MMSE-IRC receiver, $W_{RX,1}(k,l)$ may be computed as shown in Equation 6 below.

$$W_{RX,1}(k,l) = \hat{H}_1^H(k,l) R^{-1} \qquad \text{[Equation 6]}$$

At this time, R may be computed using a transmitted DM-RS as shown in Equation 7 below.

$$R = P_1 \hat{H}_1(k,l) \hat{H}_1^H(k,l) + \frac{1}{N_{sp}} \sum_{k,l \in DM-RS} \tilde{r}(k,l) \tilde{r}(k,l)^H, \qquad \text{[Equation 7]}$$

$$\tilde{r}(k,l) = r(k,l) - \hat{H}_1(k,l) d_1(k,l)$$

In Equation 7, $H_1(k,l)$ denotes an estimated radio channel, $N_{sp}$ denotes the number of samples of the DM-RS, and P1 denotes transmit power. In addition, $r(k,l)$ denotes a transmitted DM-RS and $\tilde{r}(k,l)$ denotes an estimated DM-RS.

3.3 PUSCH Resource Scheduling Method in Small Cell Environment

Assume that the embodiments of the present invention are performed in a wireless environment in which it is difficult to share scheduling information between small cells in real time. Accordingly, when the small cells perform scheduling of the UE, the radio resources used for the PUSCH by the small cells may overlap. In this case, the UE transmitting a PUSCH signal to a specific small cell may cause interference with another small cell, thereby deteriorating PUSCH reception performance.

Accordingly, in order to avoid such a phenomenon, the PUSCH regions allocated to the UE by two or more small cells configuring the multi-connectivity mode may be allocated so as not to overlap. For example, the small cells may divide PUSCH resources in the time domain or the frequency domain or may divide the PUSCH in the spatial domain if multiple antennas are supported. When the PUSCH resources are divided in the spatial domain, PUSCH transmission may be restricted to rank 1 in order to eliminate the interference signal. Information on the PUSCH resources divided in the time domain, the frequency domain, and/or the spatial domain may be shared in advance or at a long period via a wired or wireless link between scheduling cells.

In this case, two or more small cells may schedule PUSCH resources or PUCCH resources and transmit a PDCCH signal or E-PDCCH signal including uplink resource allocation information to the UE. The UE in the multi-connectivity mode may transmit the CSI via the uplink resource allocation region allocated by each of the two or more small cells.

3.4 SR Transmitting Method-1

In a multi-connectivity mode, PUSCH scheduling may be separately performed in a plurality of cells. Accordingly, SR transmission may be separately performed on each scheduling cell. However, assuming that a spatial distance between scheduling cells that perform scheduling on a UE is short and the cells are network-synchronized with each other, the UE may transmit one SR to cells in a multi-connectivity mode to request scheduling. For example, SR transmitted from the UE may be configured to be received by a plurality of scheduling cells so as to save radio resources used in SR transmission of the UE.

In this case, PUCCH allocated to the UE for SR transmission may use a virtual cell ID (VCI) indicated by a higher layer instead of a physical cell ID (PCI) of a corresponding cell. In this case, the PCI is a specific cell to each cell, and the VCI is an identifier that can be commonly used by a plurality of cells. Accordingly, the UE may transmit SR using the VCI such that a plurality of small cells receives the SR transmitted from the UE.

In this case, a plurality of cells in a multi-connectivity mode may pre-share a SR parameter to be used for SR transmission of the UE via a wireless and wired link. The SR parameter may include a period parameter indicating an SR transmission period, a subframe offset parameter indicating a subframe in which SR is transmitted, a PUCCH parameter indicating PUCCH resources for SR transmission, and so on. The SR parameter may be transmitted to the UE via a higher layer signal.

Hereinafter, the aforementioned content will be described with reference to the drawings.

Figure 18:
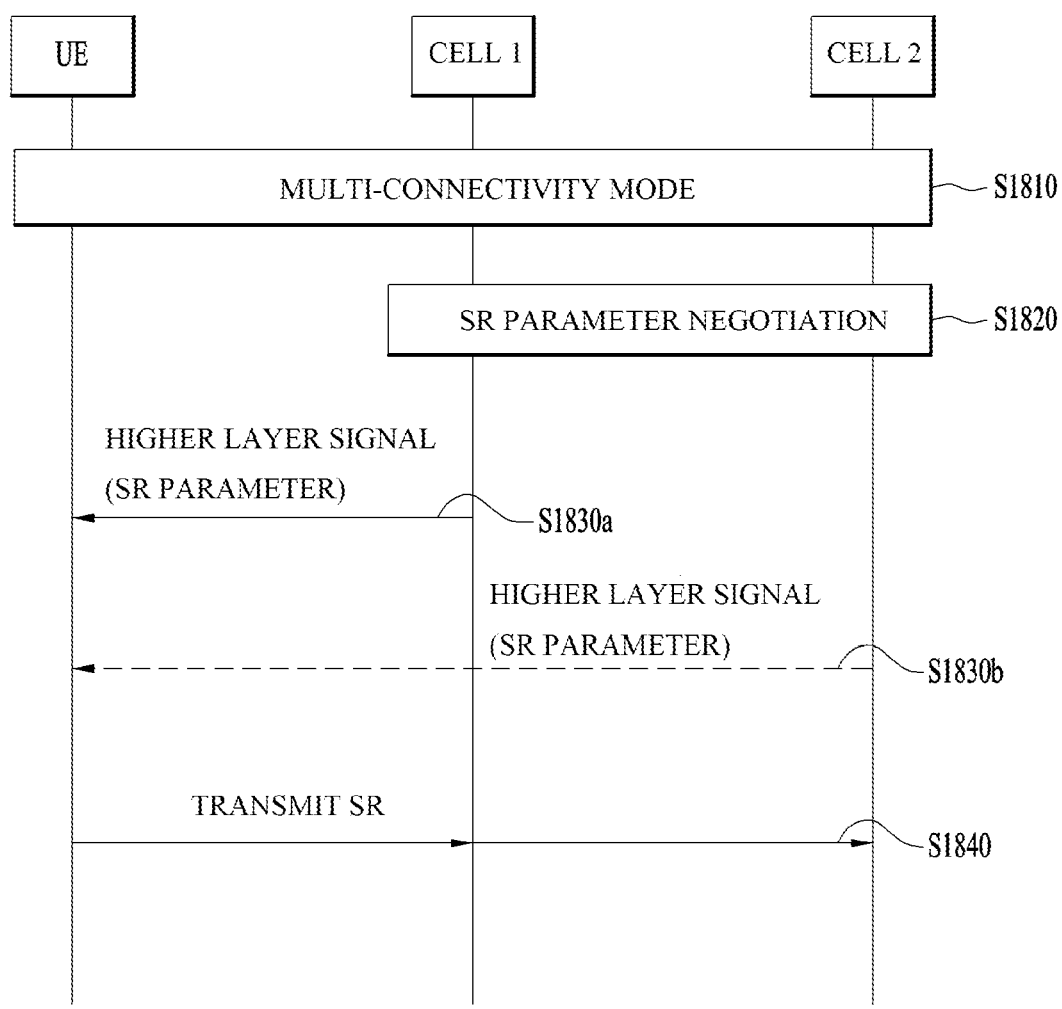
FIG. 18 is a diagram for explanation of a method for pre-negotiating SR resources by small cells in a multi-connectivity mode.

FIG. 18 is a diagram for explanation of a method for pre-negotiating SR resources by small cells in a multi-connectivity mode.

It is assumed that a UE and a plurality of small cells are configured in a multi-connectivity mode. However, for convenience of description, FIG. 18 illustrates the case in which two small cells and a UE are configured in a multi-connectivity mode. Multi-connectivity mode is referred to with respect to the description of Chapters 3.1 and 3.2 (S1810).

A first cell and a second cell as small cells may periodically negotiate for SR parameters for SR transmission or at an entrance time point into a multi-connectivity mode. That is, the first cell and the second cell may pre-negotiate and share a SR parameter to be commonly shared for SR reception of a plurality of cells in a multi-connectivity mode (S1820).

In operation S1820, a plurality of small cells may share the same SR parameter in a multi-connectivity mode so as to receive SR transmitted from the UE in the future.

Then the first cell and/or the second cell may transmit a SR parameter and/or a virtual cell ID (VCI) indicating a SR transmission period, transmission subframe offset, and a PUCCH resource region for SR transmission to the UE using a higher layer signal (S1830a and S1830b).

The UE may generate SR based on the VCI and the SR parameter and then transmit SR through PUCCH resources indicated by the SR parameter. In this case, both the first cell and the second cell may receive the SR transmitted from the UE (S1840).

One or more small cells in a multi-connectivity mode, which receive the SR, may transmit UL grant to be scheduled to the UE. In this case, since small cells in a multi-connectivity mode are connected via a non-ideal backhaul, it is difficult to share information (i.e., uplink scheduling information) about UL grant between small cells. Accordingly, hereinafter, methods for effectively transmitting UL grant to the UE by a plurality of small cells will be described.

3.4.1 UL Grant Transmitting Method-1

An eNB (i.e., a small cell) that receives SR needs to transmit UL grant for scheduling with respect to SR transmitted from a UE. In this case, it is difficult to share information about UL grant between cells, and thus a small cell to which UL grant is to be transmitted as a response to SR through wired and wireless link may be determined among small cells in a multi-connectivity mode prior to transmission of UL grant, and the determined small cell may transmit UL grant to the UE.

Figure 19:
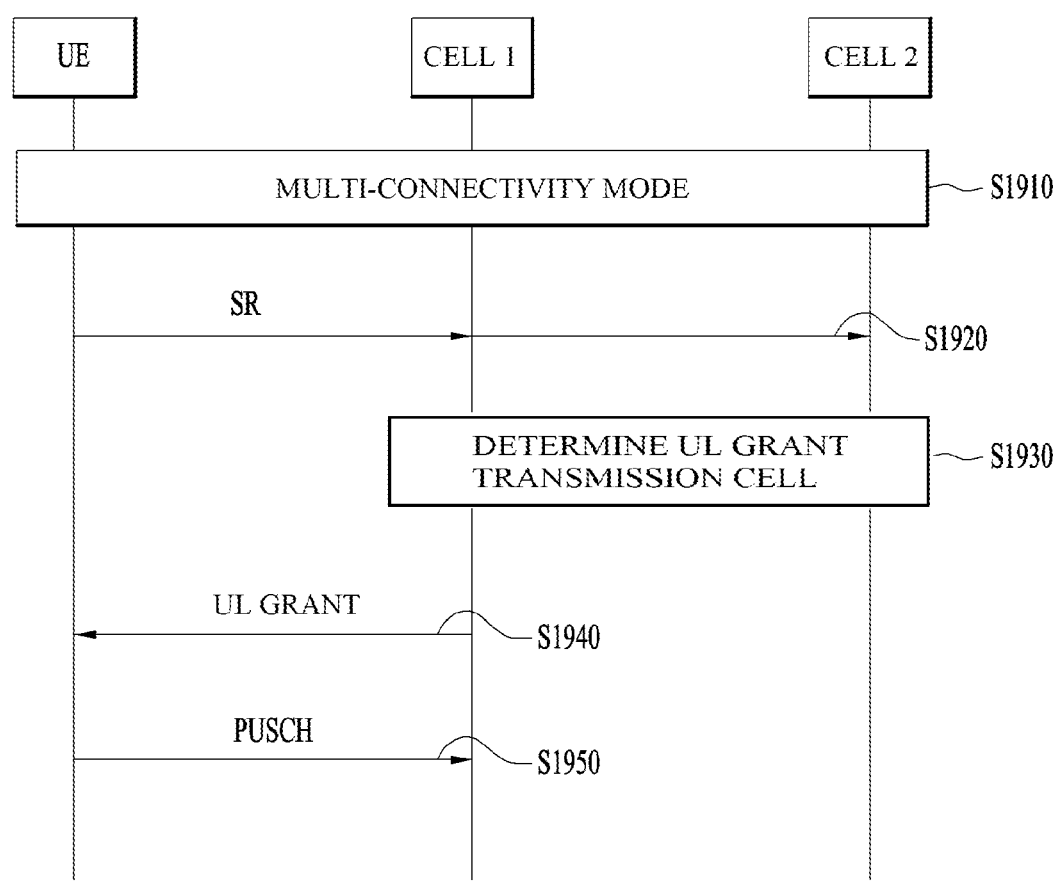
FIG. 19 is a diagram illustrating one of methods for transmitting UL grant in a multi-connectivity mode.

FIG. 19 is a diagram illustrating one of methods for transmitting UL grant in a multi-connectivity mode.

In FIG. 19, it is assumed that a UE and a plurality of small cells are configured in a multi-connectivity mode. However, for convenience of description, FIG. 19 illustrates the case in which two small cells and a UE are configured in a multi-connectivity mode. The multi-connectivity mode is referred to with respect to the description of Chapters 3.1 and 3.2 (S1910).

As described with reference to FIG. 18, in FIG. 19, it is assumed that small cells in a multi-connectivity mode share a SR parameter with respect to the UE. Accordingly, when the UE transmits SR through a PUCCH, both the first cell and the second cell may receive corresponding SR (S1920).

The first cell and the second cell that receive SR may determine a cell (i.e., a scheduling cell) to which UL grant is to be transmitted. In this case, the cell to which the UL grant is to be transmitted may be determined in consideration of load of each cell, a type of data to be transmitted by the UE, and so on. In FIG. 19, it is assumed that the first cell is a determined as the cell to which the UL grant is to be transmitted (S1930).

Accordingly, the first cell may transmit UL grant for UL scheduling to the UE and the UE that receives the UL grant may transmit a PUSCH signal to an eNB through a UL resource region indicated by the UL grant (S1940 and S1950).

3.4.2 UL Grant Transmitting Method-2

Compared to the method of Chapter 3.4.1, small cells that receive SR may transmit UL grant to the UE in response to SR without pre-negotiation. In this case, when a plurality of small cells simultaneously transmit UL grant to the UE, the UE may transmit a PUSCH signal to be differentiated in the time domain, the frequency domain, or the spatial domain. This may be applied to the case in which different PUSCH resources are allocated to small cells in a multi-connectivity mode (refer to Chapters 3.1 to 3.3).

As another method, when a plurality of small cells simultaneously transmits UL grant to the UE, the UE may select a specific cell according to the UL grant and transmit a PUSCH signal only to the selected cell.

FIG. 20 is a diagram illustrating another method for transmitting UL grant in a multi-connectivity mode.

In FIG. 20, it is assumed that a UE and a plurality of small cells are configured in a multi-connectivity mode. However, for convenience of description, FIG. 20 illustrates the case in which two small cells and a UE are configured in a multi-connectivity mode. The multi-connectivity mode is referred to with respect to the description of Chapters 3.1 and 3.2 (S2010).

As described with reference to FIG. 18, in FIG. 20, it is assumed that small cells in a multi-connectivity mode share a SR parameter with respect to the UE. Accordingly, when the UE transmits SR through a PUCCH, both the first cell and the second cell may receive corresponding SR (S2020).

The first cell and the second cell that receive SR may generate first UL grant and second UL grant that each contain UL scheduling information and transmit the first UL grant and the second UL grant to the UE (S2030 and S2040).

The UE may receive the first UL grant and the second UL grant and then select a specific cell to which a PUSCH signal is to be transmitted (S2050).

In operation S2050, a reference for selecting a specific cell by a UE is as follows.

(1) When physical cell IDs (PCIs) of small cells are converted into integers, a cell with a highest or smallest value obtained by aligning the integers in ascending order or descending order may be selected.

(2) A cell with a highest or smallest value obtained by aligning cell indexes (e.g., serving cell index (SCellIndex)) applied to respective small cells in ascending order or descending order in a higher layer may be selected (3) A primary cell, an anchor cell, or a leading cell may be selected among small cells configured in a multi-connectivity mode.

That is, the UE may select one of the aforementioned through references, select a cell to which a PUSCH is to be transmitted, and transmit a PUSCH signal to the cell. In FIG. 20, it is assumed that the first sell may be selected and a PUSCH may be transmitted to the first cell (S2060).

3.4.3 UL Grant Transmitting Method-3

When a plurality of small cells in a multi-connectivity mode receives SR, the corresponding small cells may not simultaneously transmit UL grant for SR response. For example, when the UE may receive UL grant from one small cell, the UE may transmit a PUSCH to the corresponding small cell. In this case, it is not easy to share scheduling information between small cells in a multi-connectivity mode, and thus the remaining cells may re-transmit UL grant to the UE. That is, UL grant may be transmitted to the UE from a plurality of small cells in different frames.

In this case, (1) the UE may not transmit a PUSCH with respect to later received UL grant or (2) may notify a cell to which UL grant is to be transmitted later of that UL grant is pre-transmitted and scheduled in another cell. In this case, the UE assumed that PUSCH scheduling information (i.e., UL grant) is not transmitted from cells that transmitted UL grant later.

As another method, upon receiving UL grants in different subframes from a plurality of small cells, the UE may transmit a PUSCH only to a small cell that initially transmits UL grant. In this case, the cell that receives the PUSCH from the UE may notify to the other cells configured in a multi-connectivity mode that the cell is performing scheduling on a corresponding UE through a wired and wireless link. That is, other cells may not perform UL scheduling on the UE any longer.

As another method, the UE may transmit PUSCH signals according to a plurality of UL grants.

3.5 SR Transmitting Method-2

According to another embodiment of the present invention, a UE may be configured to transmit SR for each small cell. That is, SR transmission, and UL grant transmission and PUSCH transmission to SR transmission may be independently performed for each respective small cells in a multi-connectivity mode. In this case, small cells may periodically adjust SR parameters to be previously set or at an entrance time point into a multi-connectivity mode such that the SR parameters used in the respective small cells do not overlap each other.

Accordingly, when PUSCH transmission is separated for each respective small cell, SR parameters may be set such that SR transmission for the respective small cells does not also overlap each other in the time domain. In this case, PUCCH resources used for SR transmission in a specific small cell may be used based on PCI of a corresponding small cell.

3.6 SR Transmitting Method Using PUCCH Format 3

Hereinafter, a method for transmitting SR using PUCCH format 3 will be described.

According to embodiments of the present invention, a UE may transmit SR in order to request a small cell to allocate UL resources. For example, the UE may transmit SR to a primary cell (PCell), a secondary cell (SCell), or a cell set by a higher layer. In this case, PUCCH resources used for SR transmission may use PCI of a corresponding cell. In this case, the UE may transmit an ACK/NACK information bit and a SR information bit to the small cell using PUCCH format 3.

According to embodiments of the present invention, it is assumed that SR transmission is performed on each respective cell. However, the method for transmitting SR to all small cells in a multi-connectivity mode using SR transmission resource (see Chapters 3.3 and 3.4) and the method for setting different SR parameters between small cells (see Chapters 3.3 and 3.5) in order to prevent collision between small cells in a multi-connectivity mode during SR transmission have been described. Hereinafter, a method for configuring SR transmission for a plurality of cells in the former method will be described in detail.

FIG. 21 is a diagram illustrating one of methods for transmitting SR using PUCCH format 3.

The description of FIG. 21 will be basically given based on the description of FIG. 16. In FIG. 21, 'A' refers to an information bit for a first cell, input to a first RM encoder, and 'B' refers to an information bit for a second cell, input to a second RM encoder. That is, a UE may position the information bit for the first cell (cell 1) at 'A' to perform (32, A) RM coding and position the information bit for the second cell (cell 2) at 'B' to perform (32, B) RM coding. Then all the RM encoded bitstreams may be interleaved to generate one information bit. Then the UE may transmit the generated information bit through a pre-allocated PUCCH region.

For example, an information bit to be transmitted by the UE may be an ACK/NACK bit. The UE may position an ACK/NACK bit of the first cell at A to perform (32, A) RM encoding, position an ACK/NACK bit of the second cell at B to perform (32, B) RM encoding, and then interleave and transmit all the RM encoded bitstreams. An eNB may deinterleave the received bitstream, apply the encoded bitstreams to an ACK/NACK of the eNB, and then perform RM decoding to acquire ACK/NACK information.

In addition, the UE may input a bitstream corresponding to NACK to an input node of a corresponding RM encoder with respect to a cell to which a PDSCH is not transmitted. In this case, all encoded bitstreams of the corresponding RM encoder are derived as '0', which is equivalent to the case in which all corresponding parts of bitsteams output from an output node of the interleaver. For example, when the second cell does not transmit a PDSCH and only the first cell transmits a PDSCH, the UE may perform (32, A) RM encoding to transmit ACK/NACK. On the other hand, when the first cell does not transmit a PDSCH and only the second cell transmits a PDSCH, the UE may perform (32, B) RM encoding to transmit ACK/NACK.

When the UE transmits SR to the first cell, a SR information bit may be positioned at 'A' and (32, A) joint-encoded with an ACK/NACK information bit of the first cell. In addition, when the UE transmits SR to the second cell, a SR information bit may be positioned at 'B' and (32, B) joint-encoded with an ACK/NACK information bit of the second cell.

In this case, positions of the SR information bits may be predetermined. For example, when SR transmission is independently performed on each respective small cell, the UE may insert SR information bits corresponding to the first cell and the second cell into 'A' and 'B', respectively, may (32, A) and (32, B) joint-encode ACK/NACK information and the SR information bits corresponding to the small cells, respectively, and may transmit the ACK/NACK information and the SR information bits.

4. Apparatuses

Apparatuses illustrated in FIG. 22 are means that can implement the methods described before with reference to FIGS. 1 to 21.

A UE may act as a transmitter on a UL and as a receiver on a DL. An eNB may act as a receiver on a UL and as a transmitter on a DL.

That is, each of the UE and the eNB may include a Transmission (Tx) module 2240 or 2250 and a Reception (Rx) module 2260 or 2270, for controlling transmission and reception of information, data, and/or messages, and an antenna 2200 or 2210 for transmitting and receiving information, data, and/or messages.

Each of the UE and the eNB may further include a processor 2220 or 2230 for implementing the afore-described embodiments of the present disclosure and a memory 2280 or 2290 for temporarily or permanently storing operations of the processor 2220 or 2230.

The embodiments of the present invention may be performed using the components and functions of the above-described UE and eNB. For example, the processor of the eNB may combine methods disclosed in Chapters 1 to 3 to pre-negotiate and shares SR parameters for SR transmission and to pre-allocate the uplink channel region for SR transmission between the small cells. In addition, the processor of the eNB may control the transmission module to explicitly transmit the SR parameter to the UE using a higher layer signal. The processor of the UE may generate and transmit, to the eNB, one or more of ACK/NACK information bits for PDSCH signals received from the two or more small cells, SR information bits for scheduling request, and CSI bits for reporting a channel state via an allocated channel region. For a detailed description thereof, refer to Chapters 1 to 3.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 22 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi-Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2280 or 2290 and executed by the processor 2220 or 2230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for transmitting a scheduling request (SR) by a user equipment (UE) in a wireless access system, the method comprising:
when the UE is configured with a multi-connectivity mode for communications with a first cell and a second cell, receiving, from at least one of the first cell or the second cell, a higher layer signal comprising an SR parameter for SR transmission and a virtual cell identifier (VCI),
wherein the VCI is commonly used by the first cell and the second cell;
generating an SR based on the received SR parameter and the received VCI;
transmitting, to the first cell and the second cell, the SR through a physical uplink control channel (PUCCH) using the received VCI; and
receiving an uplink grant from a predefined cell,
wherein the predefined cell is the first cell or the second cell as determined by negotiation between the first cell and the second cell.

2. The method according to claim 1, further comprising:
receiving a first uplink grant and a second uplink grant comprising uplink scheduling information in response to the SR from the first cell and the second cell, respectively;
selecting a cell to which a physical uplink shared channel (PUSCH) signal is to be transmitted; and
transmitting the PUSCH signal to the selected cell.

3. The method according to claim 2, wherein the UE selects the cell to which the PUSCH signal is to be transmitted based on a physical cell identifier (PCI) or a serving cell index (ScellIndex) of the cell.

4. The method according to claim 1, wherein the SR is joint-encoded and transmitted with an Acknowledgement/Negative Acknowledgement (ACK/NACK) signal to one or more of the first cell and the second cell.

5. A user equipment (UE) for transmitting a scheduling request (SR) in a wireless access system, the UE comprising:
a transmitter;
a receiver; and
a processor wherein the processor is configured to:
when the UE is configured with a multi-connectivity mode for communications with a first cell and a second cell, control the receiver to receive, from at least one of the first cell or the second cell, a higher layer signal comprising a SR parameter and a virtual cell identifier (VCI),
wherein the VCI is commonly used by the first cell and the second cell;
generate an SR based on the received SR parameter and the received VCI;
control the transmitter to transmit, to the first cell and the second cell, the SR using the received VCI through a physical uplink control channel (PUCCH); and
control the receiver to receive an uplink grant from a predefined cell,
wherein the predefined cell is the first cell or the second cell as determined by negotiation between the first cell and the second cell.

6. The UE according to claim 5, wherein the processor is further configured to:
control the receiver to receive a first uplink grant and a second uplink grant comprising uplink scheduling information in response to the SR from the first cell and the second cell, respectively;
control the processor to select a cell to which a physical uplink shared channel (PUSCH) signal is to be transmitted; and
control the transmitter to transmit the PUSCH signal to the selected cell.

7. The UE according to claim 6, wherein the processor selects the cell to which the PUSCH signal is to be transmitted based on a physical cell identifier (PCI) or a serving cell index (ScellIndex) of the cell.

8. The UE according to claim 5, wherein the SR is joint-encoded and transmitted with an Acknowledgement/Negative Acknowledgement (ACK/NACK) signal to one or more of the first cell and the second cell.

* * * * *